US012297038B2

(12) United States Patent
Dunn et al.

(10) Patent No.: US 12,297,038 B2
(45) **Date of Patent: *May 13, 2025**

(54) CONTAINER FOR RECEIVING MULTIPLE FLEXIBLE BAG ASSEMBLIES

(71) Applicant: Munchkin, Inc., Van Nuys, CA (US)

(72) Inventors: Steven Bryan Dunn, Beverly Hills, CA (US); Mark A. Hatherill, Beverly Hills, CA (US); Kevin D. Johnson, Tarzana, CA (US); Matthew Joseph Saxton, Agoura, CA (US)

(73) Assignee: MUNCHKIN, INC., Van Nuys, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 17/165,890

(22) Filed: Feb. 2, 2021

(65) Prior Publication Data

US 2021/0155404 A1 May 27, 2021

Related U.S. Application Data

(63) Continuation of application No. 16/928,812, filed on Jul. 14, 2020, now Pat. No. 10,906,737, which is a continuation of application No. 16/006,806, filed on Jun. 12, 2018, now Pat. No. 10,710,799, which is a continuation of application No. 14/967,255, filed on Dec. 11, 2015, now Pat. No. 9,994,393.

(60) Provisional application No. 62/090,558, filed on Dec. 11, 2014.

(51) Int. Cl.

| | |
|---|---|
| ***B65F 1/00*** | (2006.01) |
| ***B65B 9/10*** | (2006.01) |
| ***B65F 1/06*** | (2006.01) |
| ***B65F 1/16*** | (2006.01) |

(52) U.S. Cl.

CPC ............ *B65F 1/062* (2013.01); *B65F 1/1615* (2013.01); *B65F 1/163* (2013.01); *B65F 2001/1669* (2013.01); *B65F 2210/129* (2013.01); *B65F 2210/1675* (2013.01); *B65F 2240/132* (2013.01)

(58) Field of Classification Search

CPC .. B65D 2240/132; B65D 1/06; B65D 1/0006; B65F 1/062; B65F 1/1615; B65F 1/163; B65F 1/1426; B65F 2001/1669; B65F 2210/129; B65F 2210/1675; B65B 67/1277; B65B 67/125

USPC ....................... 220/495.05; 53/567, 370, 576

See application file for complete search history.

(56) References Cited

U.S. PATENT DOCUMENTS 3,321,103 A * 5/1967 Phillips ..................... B65F 1/06 53/469
3,452,368 A * 7/1969 Couper ................ A47K 11/026 53/567
3,602,924 A * 9/1971 Kneisley ................ A47B 45/00 4/315
3,619,822 A * 11/1971 Carmichael .......... A47K 11/026 4/484
4,934,529 A * 6/1990 Richards ............. B65B 67/1277 206/802

(Continued)

*Primary Examiner* — Gideon R Weinerth

(74) *Attorney, Agent, or Firm* — Robert Z. Evora, Esq.

(57) ABSTRACT

Containers are described which can accommodate a variety of flexible bag assemblies used for containing waste. Internal accommodating structures are designed to accommodate and secure various types of bag assemblies, including single bag assemblies and cassettes.

19 Claims, 40 Drawing Sheets

(56) References Cited

U.S. PATENT DOCUMENTS

| | | | | |
|---|---|---|---|---|
| 5,535,913 | A * | 7/1996 | Asbach | B65F 1/1607 220/495.08 |
| 6,612,099 | B2 * | 9/2003 | Stravitz | B65F 1/12 53/526 |
| 6,974,029 | B2 * | 12/2005 | Morand | B65B 67/1277 53/567 |
| 7,146,785 | B2 * | 12/2006 | Stravitz | B65B 9/15 53/118 |
| 7,406,814 | B2 * | 8/2008 | Morand | B65F 1/062 53/567 |
| 7,617,660 | B2 * | 11/2009 | Morand | B65B 67/1277 53/574 |
| 7,694,493 | B2 * | 4/2010 | Stravitz | B65B 67/1277 53/370 |
| 7,696,711 | B2 * | 4/2010 | Pollack | B65F 1/1607 53/574 |
| 7,712,285 | B2 * | 5/2010 | Stravitz | B65F 1/062 53/77 |
| 7,743,588 | B2 * | 6/2010 | Webb | B65F 1/1426 53/577 |
| D619,905 | S * | 7/2010 | Dunn | D9/703 |
| 7,878,359 | B1 * | 2/2011 | Ko | B65F 1/163 220/87.2 |
| D639,002 | S * | 5/2011 | Dunn | D32/37 |
| D639,003 | S * | 5/2011 | Dunn | D32/37 |
| D639,004 | S * | 5/2011 | Dunn | D32/37 |
| 7,958,704 | B2 * | 6/2011 | Stravitz | B65F 1/062 220/495.07 |
| 7,963,414 | B1 * | 6/2011 | Stravitz | B65F 1/1623 220/264 |
| 8,087,532 | B2 * | 1/2012 | Brown | B65F 1/0006 220/255 |
| 8,235,237 | B1 * | 8/2012 | Stravitz | B65F 1/163 220/495.07 |
| 8,266,870 | B1 * | 9/2012 | Stravitz | B65F 1/16 53/567 |
| 8,266,871 | B1 * | 9/2012 | Stravitz | B65F 1/16 53/567 |
| 8,333,293 | B2 * | 12/2012 | Morand | B65F 1/1607 220/264 |
| 8,393,489 | B1 * | 3/2013 | Stravitz | B65F 1/163 220/264 |
| D695,541 | S * | 12/2013 | Dunn | B65F 1/0006 D6/515 |
| 8,635,838 | B2 * | 1/2014 | Dunn | B32B 27/28 53/284.7 |
| 8,833,592 | B2 * | 9/2014 | Dunn | B65F 1/0006 220/495.08 |
| 8,844,751 | B2 * | 9/2014 | Sakaguchi | B65F 1/1607 220/495.11 |
| 8,910,821 | B1 * | 12/2014 | Stravitz | B65F 1/163 220/495.08 |
| 9,056,716 | B1 * | 6/2015 | Stravitz | B65F 1/163 |
| 9,555,962 | B1 * | 1/2017 | Stravitz | B65F 1/068 |
| 9,573,757 | B1 * | 2/2017 | Stravitz | B65F 1/06 |
| 9,745,127 | B1 * | 8/2017 | Stravitz | B65F 1/06 |
| 9,834,376 | B1 * | 12/2017 | Stravitz | B65F 1/0026 |
| 9,994,393 | B2 * | 6/2018 | Dunn | B65F 1/163 |
| 10,053,283 | B1 * | 8/2018 | Stravitz | B65B 67/1211 |
| 10,053,284 | B2 * | 8/2018 | Dunn | B65F 1/062 |
| 10,086,996 | B2 * | 10/2018 | Dunn | B65F 1/062 |
| 10,179,697 | B2 * | 1/2019 | Chenvainu | B65F 1/163 |
| 10,214,347 | B2 * | 2/2019 | Hammond | B65F 1/062 |
| 10,486,899 | B1 * | 11/2019 | Stravitz | B65F 1/06 |
| 10,611,564 | B1 * | 4/2020 | Stravitz | B65F 1/10 |
| 10,654,647 | B2 * | 5/2020 | Chakravarthy | B65F 1/062 |
| 10,696,476 | B2 * | 6/2020 | Morand | B65F 1/0006 |
| 10,710,799 | B2 * | 7/2020 | Dunn | B65F 1/1615 |
| 10,906,737 | B2 * | 2/2021 | Dunn | B65F 1/062 |
| 11,008,162 | B1 * | 5/2021 | Stravitz | B65F 1/1415 |
| 11,414,266 | B2 * | 8/2022 | Dunn | B65F 1/0006 |
| 11,753,239 | B2 * | 9/2023 | Dunn | B65F 1/0006 206/409 |
| D1,000,859 | S * | 10/2023 | Dunn | D6/515 |
| 11,858,730 | B1 * | 1/2024 | Stringer | B65F 1/062 |
| 2003/0121923 | A1 * | 7/2003 | Morand | A47K 11/02 220/495.07 |
| 2004/0020175 | A1 * | 2/2004 | Stravitz | B09B 3/20 53/567 |
| 2005/0016890 | A1 * | 1/2005 | Tannock | B65B 9/18 206/497 |
| 2005/0044819 | A1 * | 3/2005 | Chomik | B65B 9/15 53/469 |
| 2005/0183400 | A1 * | 8/2005 | Stravitz | B65F 1/12 53/567 |
| 2005/0188661 | A1 * | 9/2005 | Stravitz | B65B 67/1277 53/567 |
| 2005/0193691 | A1 * | 9/2005 | Stravitz | B65F 1/062 53/567 |
| 2005/0193692 | A1 * | 9/2005 | Stravitz | B65F 1/12 53/567 |
| 2005/0217214 | A1 * | 10/2005 | Richardson | B65B 67/1277 53/567 |
| 2006/0021301 | A1 * | 2/2006 | Stravitz | B65B 67/1277 53/576 |
| 2006/0130439 | A1 * | 6/2006 | Stravitz | B65F 1/062 53/567 |
| 2006/0273089 | A1 * | 12/2006 | Chiou | B65F 1/163 220/262 |
| 2007/0157581 | A1 * | 7/2007 | Webb | B65F 1/062 53/576 |
| 2007/0175182 | A1 * | 8/2007 | Stravitz | B65F 1/062 53/576 |
| 2007/0180798 | A1 * | 8/2007 | Stravitz | B65F 1/062 53/576 |
| 2007/0219425 | A1 * | 9/2007 | Moore | A47K 11/026 600/300 |
| 2007/0246465 | A1 * | 10/2007 | Stravitz | B65F 1/12 220/660 |
| 2008/0019618 | A1 * | 1/2008 | Dayton | B65F 1/1415 383/62 |
| 2008/0272140 | A1 * | 11/2008 | Mowers | B65F 1/062 221/69 |
| 2009/0100806 | A1 * | 4/2009 | Morand | B65F 1/062 53/567 |
| 2010/0005759 | A1 * | 1/2010 | Stravitz | B65F 1/062 53/118 |
| 2010/0005762 | A1 * | 1/2010 | Stravitz | B65F 1/062 53/567 |
| 2010/0006712 | A1 * | 1/2010 | Stravitz | B65F 1/062 248/99 |
| 2011/0056173 | A1 * | 3/2011 | Ohnishi | B65F 1/062 53/389.2 |
| 2011/0056941 | A1 * | 3/2011 | Ohnishi | B65F 1/062 220/254.9 |
| 2011/0056953 | A1 * | 3/2011 | Ohnishi | B65F 1/062 220/495.07 |
| 2011/0056967 | A1 * | 3/2011 | Ohnishi | B65F 1/062 220/694 |
| 2011/0099944 | A1 * | 5/2011 | Dunn | B65F 1/0006 53/211 |
| 2011/0099945 | A1 * | 5/2011 | Dunn | B65F 1/06 53/211 |
| 2011/0099950 | A1 * | 5/2011 | Dunn | B65F 1/062 53/469 |
| 2011/0099954 | A1 * | 5/2011 | Cudworth | B65F 1/062 53/510 |
| 2011/0099956 | A1 * | 5/2011 | Dunn | B65F 7/00 383/127 |
| 2011/0099957 | A1 * | 5/2011 | Dunn | B65F 1/06 53/567 |
| 2011/0099958 | A1 * | 5/2011 | Dunn | B65F 1/0006 53/567 |
| 2011/0100995 | A1 * | 5/2011 | Dunn | B32B 27/08 220/495.01 |
| 2011/0100996 | A1 * | 5/2011 | Dunn | B65F 1/062 220/9.4 |
| 2011/0101014 | A1 * | 5/2011 | Conrad | B65F 1/06 220/810 |

(56) References Cited

U.S. PATENT DOCUMENTS

| | | | | |
|---|---|---|---|---|
| 2011/0104022 A1* | 5/2011 | Dunn | B65F 1/062 | 422/292 |
| 2012/0073250 A1* | 3/2012 | Cudworth | B65F 1/062 | 53/545 |
| 2012/0091295 A1* | 4/2012 | Morand | B65F 1/002 | 248/99 |
| 2012/0211494 A1* | 8/2012 | Morand | B65F 1/062 | 220/495.08 |
| 2014/0042168 A1* | 2/2014 | Dunn | B65F 1/0006 | 220/495.05 |
| 2016/0060025 A1* | 3/2016 | Dunn | B65F 1/062 | 206/409 |
| 2016/0060026 A1* | 3/2016 | McConnell | B65F 1/06 | 220/495.08 |
| 2016/0060027 A1* | 3/2016 | McConnell | B65F 1/163 | 434/236 |
| 2016/0060028 A1* | 3/2016 | McConnell | G09B 19/00 | 356/244 |
| 2016/0060029 A1* | 3/2016 | McConnell | B65F 1/0006 | 383/33 |
| 2016/0083182 A1* | 3/2016 | Dunn | B65F 1/062 | 206/409 |
| 2016/0167872 A1* | 6/2016 | Dunn | B65F 1/062 | 220/495.07 |
| 2016/0167873 A1* | 6/2016 | Dunn | B65F 1/062 | 220/495.07 |
| 2016/0167874 A1* | 6/2016 | Dunn | B65F 1/062 | 220/495.05 |
| 2017/0291789 A1* | 10/2017 | Wong | B65F 1/068 | |
| 2018/0118458 A1* | 5/2018 | Blatter | B65F 1/065 | |
| 2018/0155123 A1* | 6/2018 | Parker | B65F 1/068 | |
| 2019/0177082 A1* | 6/2019 | Lee | B65F 1/0073 | |
| 2021/0283288 A1* | 9/2021 | Dunn | B65F 1/163 | |
| 2022/0332499 A1* | 10/2022 | McConnell | B65F 1/1607 | |
| 2022/0356009 A1* | 11/2022 | Dunn | A61L 2/10 | |
| 2022/0388767 A1* | 12/2022 | Dunn | B65F 1/062 | |
| 2023/0373711 A1* | 11/2023 | Morand | A61F 13/5512 | |
| 2024/0002145 A1* | 1/2024 | Johnson | B65F 1/062 | |

* cited by examiner

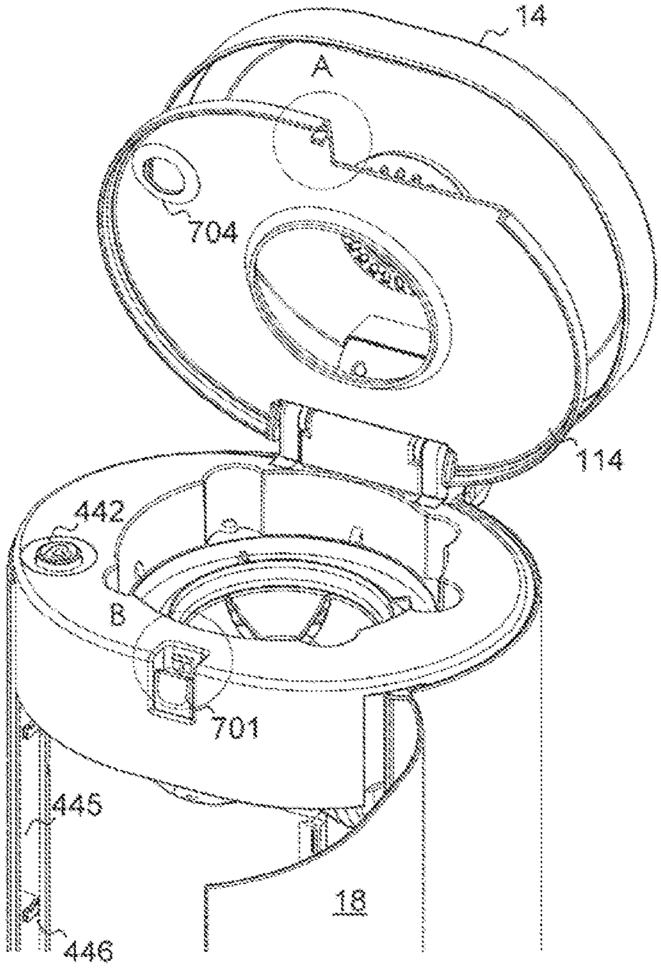
FIG. 50
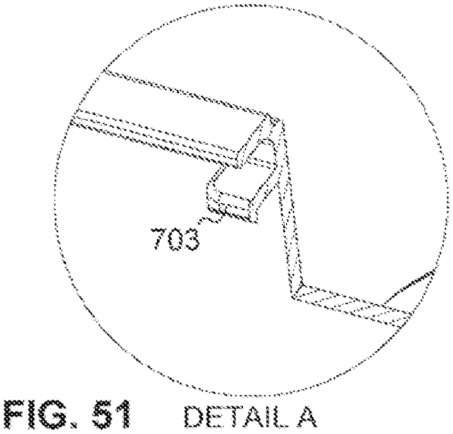
FIG. 51 DETAIL A
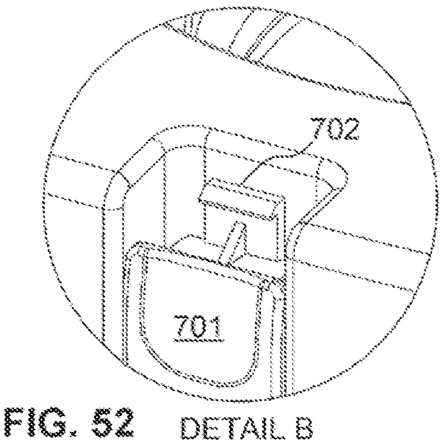
FIG. 52 DETAIL B

CONTAINER FOR RECEIVING MULTIPLE FLEXIBLE BAG ASSEMBLIES

CROSS REFERENCE TO RELATED APPLICATIONS

This application is a continuation of U.S. patent application Ser. No. 16/928,812 filed Jul. 14, 2020, which is a continuation of U.S. patent application Ser. No. 16/006,806, filed Jun. 12, 2018, now U.S. Pat. No. 10,710,799; which is a continuation of U.S. patent application Ser. No. 14/967,255, filed Dec. 11, 2015, now U.S. Pat. No. 9,994,393; which claims priority to U.S. Provisional Patent Application Ser. No. 62/090,558, filed Dec. 11, 2014; the contents of which are hereby incorporated by reference herein in their entirety into this disclosure.

TECHNICAL FIELD

The subject disclosure relates to a waste disposal and system. More specifically, to a multi-component container system, such as a pail assembly, being configured for use with various bag assemblies, including a single use bag and/or a cassette having a resilient flexible tubing packed therein.

BRIEF DESCRIPTION OF THE DRAWINGS

Various exemplary embodiments of this disclosure will be described in detail, wherein like reference numerals refer to identical or similar components or steps, with reference to the following figures, wherein:

FIGS. 50-52 show a front perspective view and detailed views, of an exemplary latching mechanism for the internal lid of the pail assembly.

DETAILED DESCRIPTION

Particular embodiments of the present invention will now be described in greater detail with reference to the figures.

Figure 2:
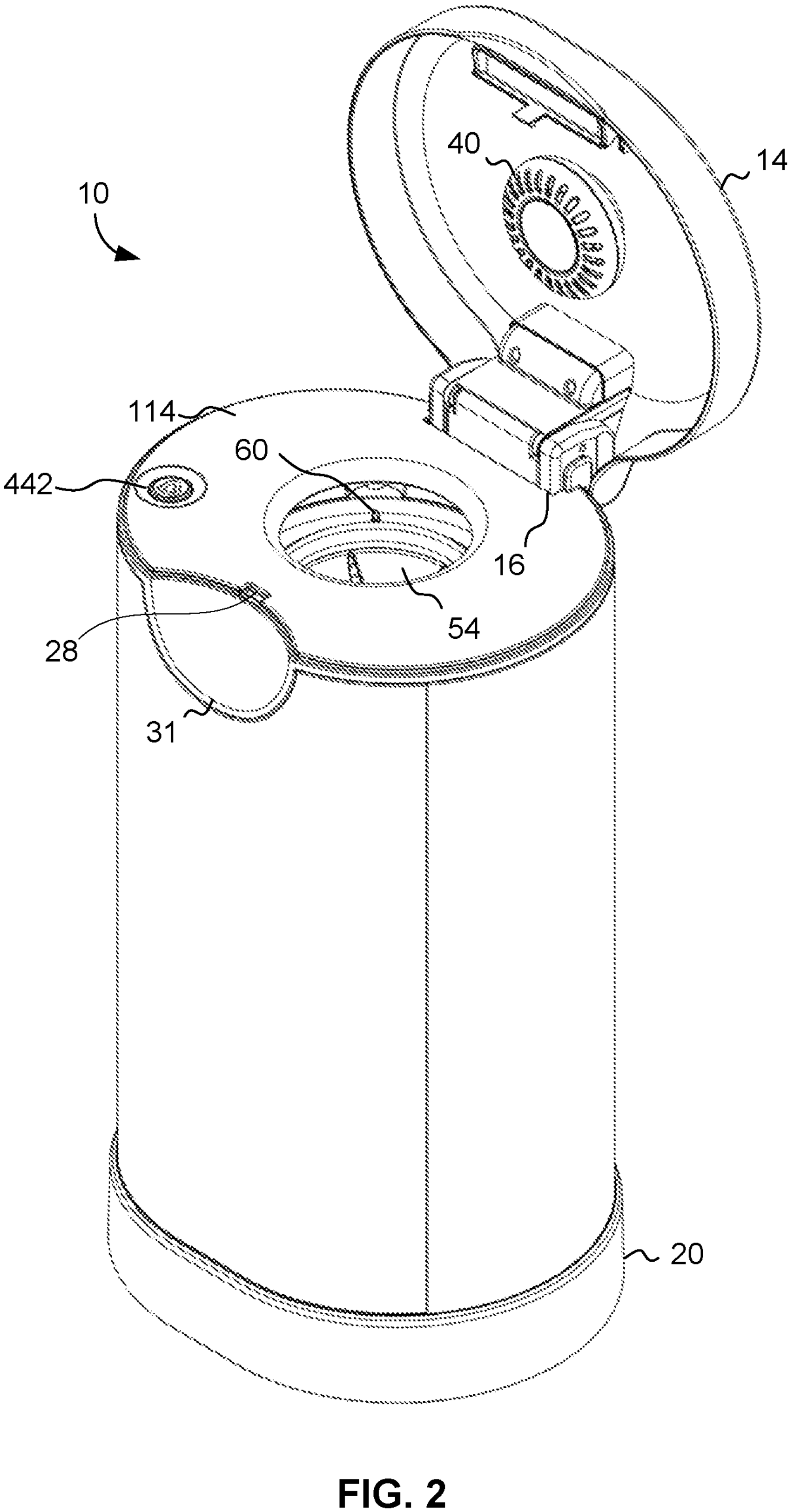
FIG. 2 depicts a top perspective view of the pail assembly with the internal lid closed.
Figure 3:
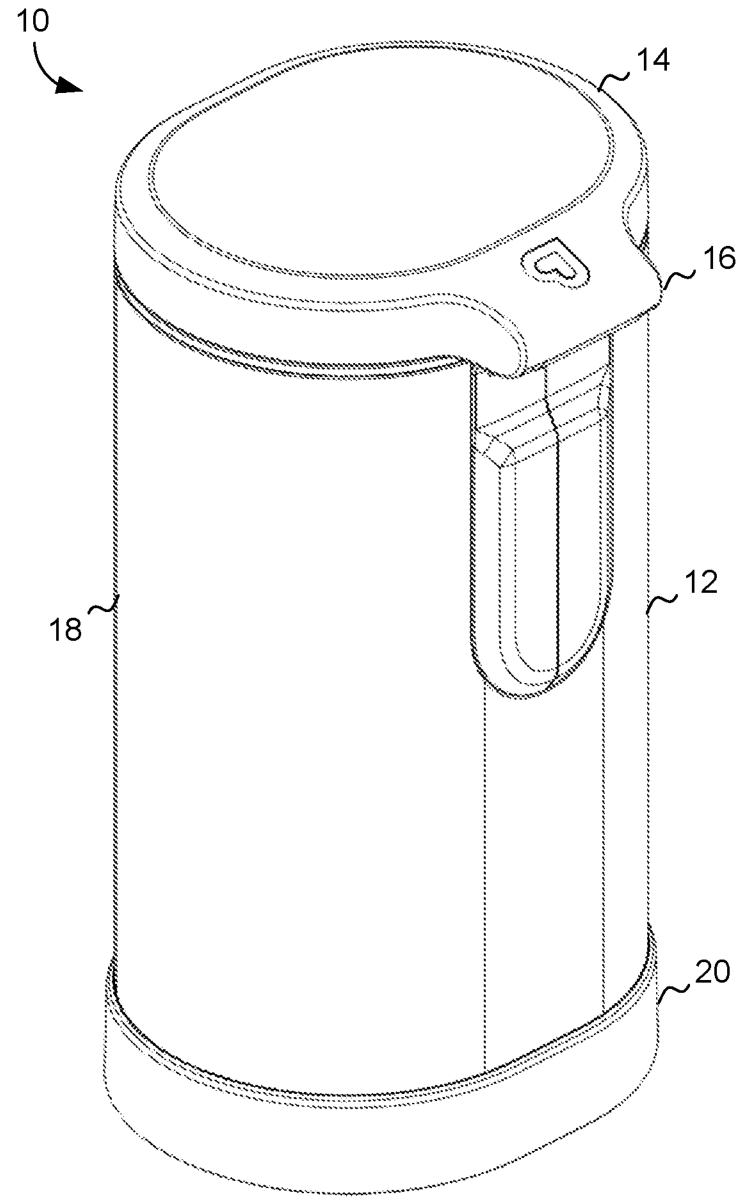
FIG. 3 shows a top perspective view of the pail assembly with the lid closed.
Figure 4:
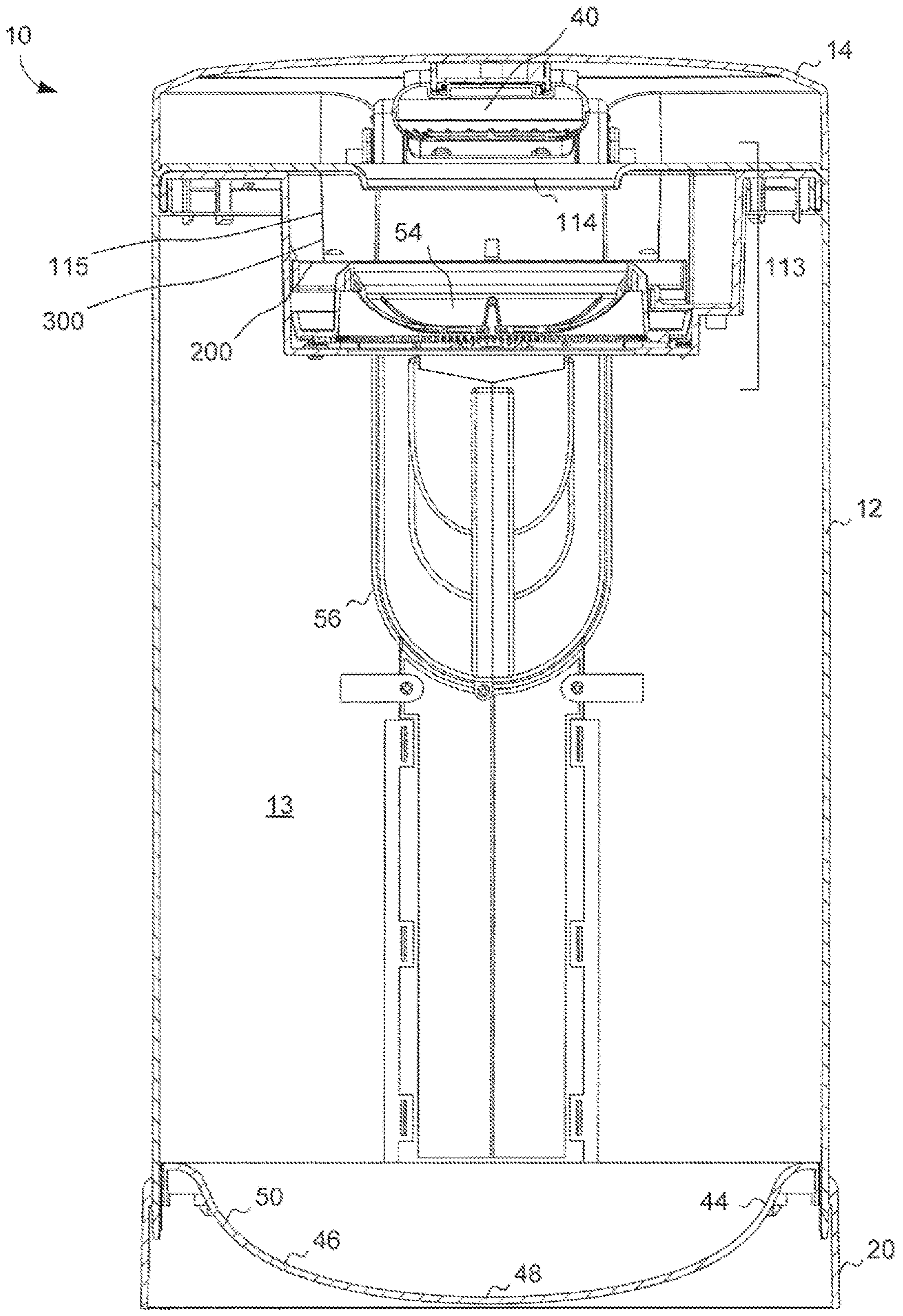
FIG. 4 illustrates a cross section view of the pail assembly.

FIGS. 1-4 illustrate a container, such as a diaper pail assembly or system, 10 adapted to receive multiple flexible bag assemblies. The diaper pail assembly or system 10 includes a housing 12 enclosed by a lid member 14. As shown in FIG. 4, a waste chamber 113 is positioned within the housing 12 above an interior storage space 13 and is configured to receive an article of waste within a flexible bag assembly 110.

Figure 1A:
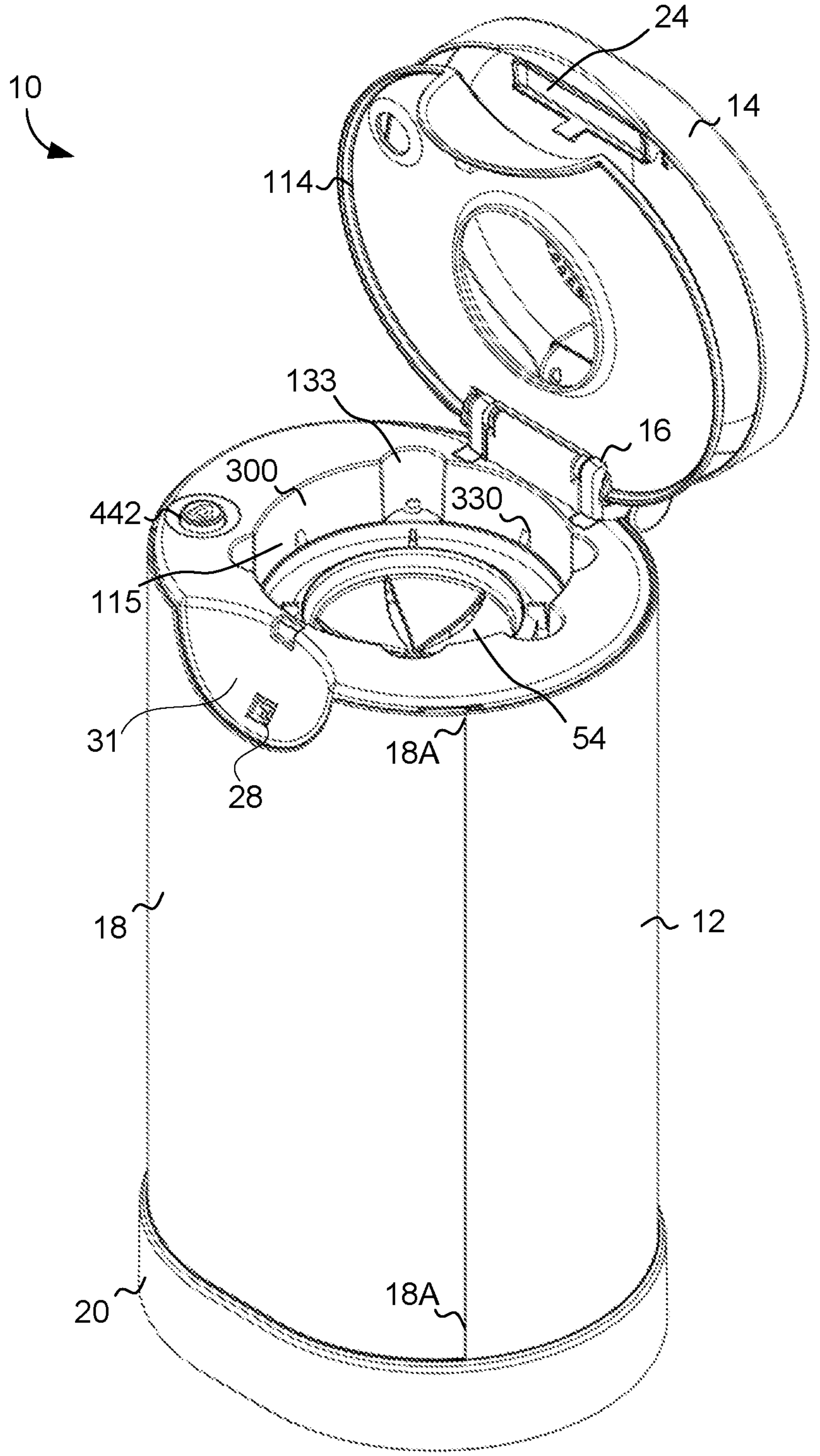
FIGS. 1A-1B illustrate top and detailed perspective views, respectively, of a pail assembly according to the subject disclosure.
Figure 1B:
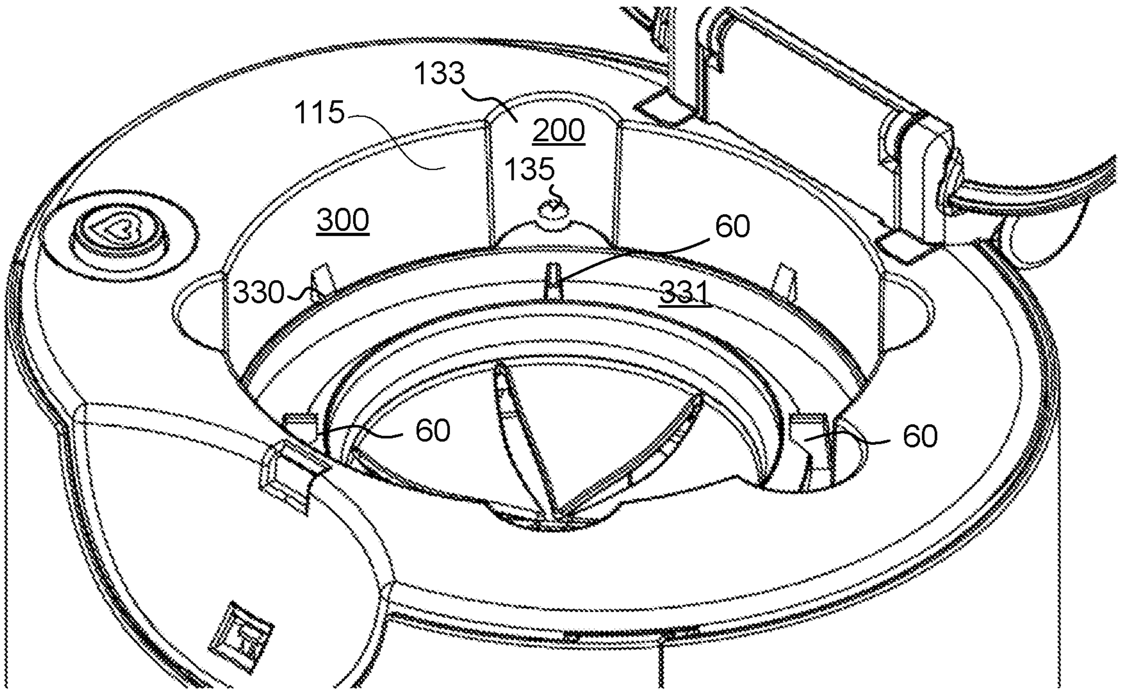

As shown in FIG. 1B, a first support structure 200 and a second support structure 300 accommodate various style of bag inserts, whether they are single use bags or a cassette having a roll of tubing, as will be described in more detail below. A first support structure 200 includes recesses 133 having a semi-circular shape are used to accommodate single use bags by receiving their external tabs, and securing those tabs in place by use of tab clip 135. A second support structure 300 includes key projections 60 that project upward a predetermined distance so that they mate with apertures 11 at a bottom portion of an insertable cassette 310. A circular bottom receiving plate 331 is held into location by tabs 330 located on the interior wall of annular cylindrical recess 115 and is used to serve as the base for all types of receiving bag assemblies. The mechanisms for these exemplary bag assemblies will be described in more detail below.

The lid member 14 is connected to the housing 12 by a hinge mechanism 16 so that the lid member 14 can be moved by a user, such as a parent or caregiver, between an open position that is shown in FIGS. 1-2 and a closed position that is shown in FIG. 3.

Figure 18:
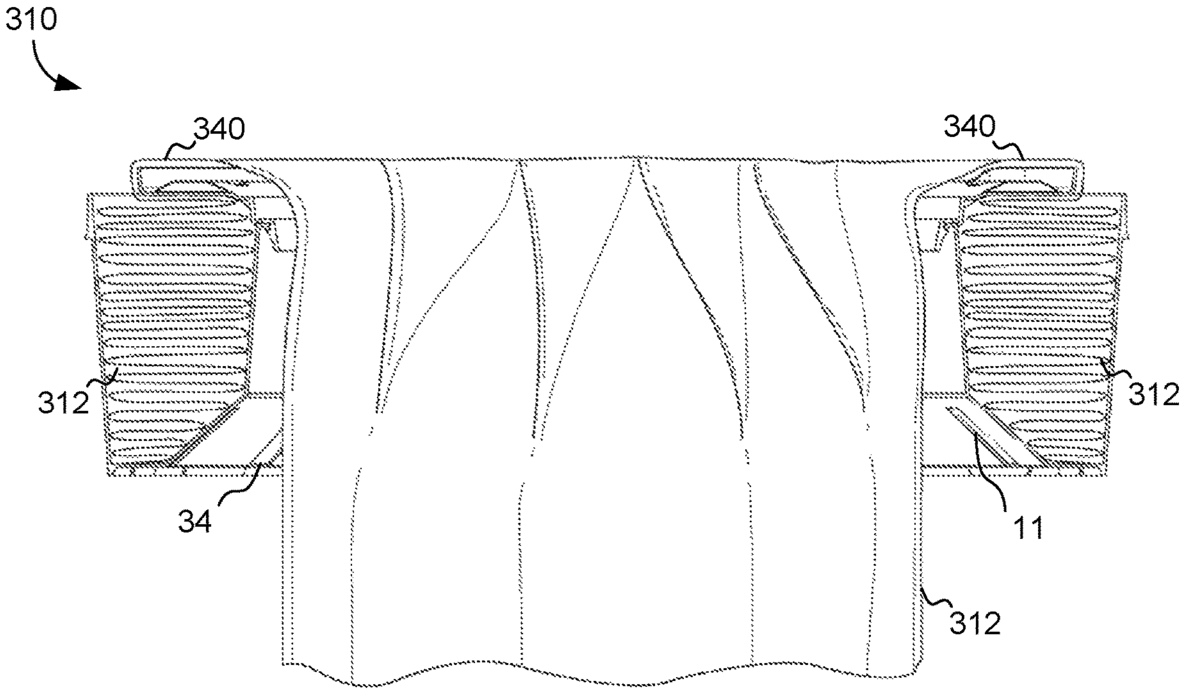

The flexible bag assembly may come in various embodiments. In a first embodiment, the flexible bag assembly may be embodied as a flexible bag frame 214, such as a single use bag shown in FIGS. 9 and 14 and described in more detail below. In a second embodiment, the flexible bag assembly may be embodied as a length of a packed flexible tubing 312 drawn from within a cassette 310, such as the cassette 310 and tubing 312 as shown in FIGS. 10 and 18 and described in more detail below.

The waste chamber 113 shown in FIG. 4 is constructed to include a first support structure 200 to secure the flexible bag 210. The waste chamber 113 is further constructed to include a second support structure 300 to secure and support a cassette 310 from which the flexible tubing 312 is drawn from the cassette 310. The waste chamber 113 is resilient enough to accommodate various designs of bag assemblies and bag assemblies may be designed to accommodate the accommodating structure of waste chamber 113.

Figure 14:
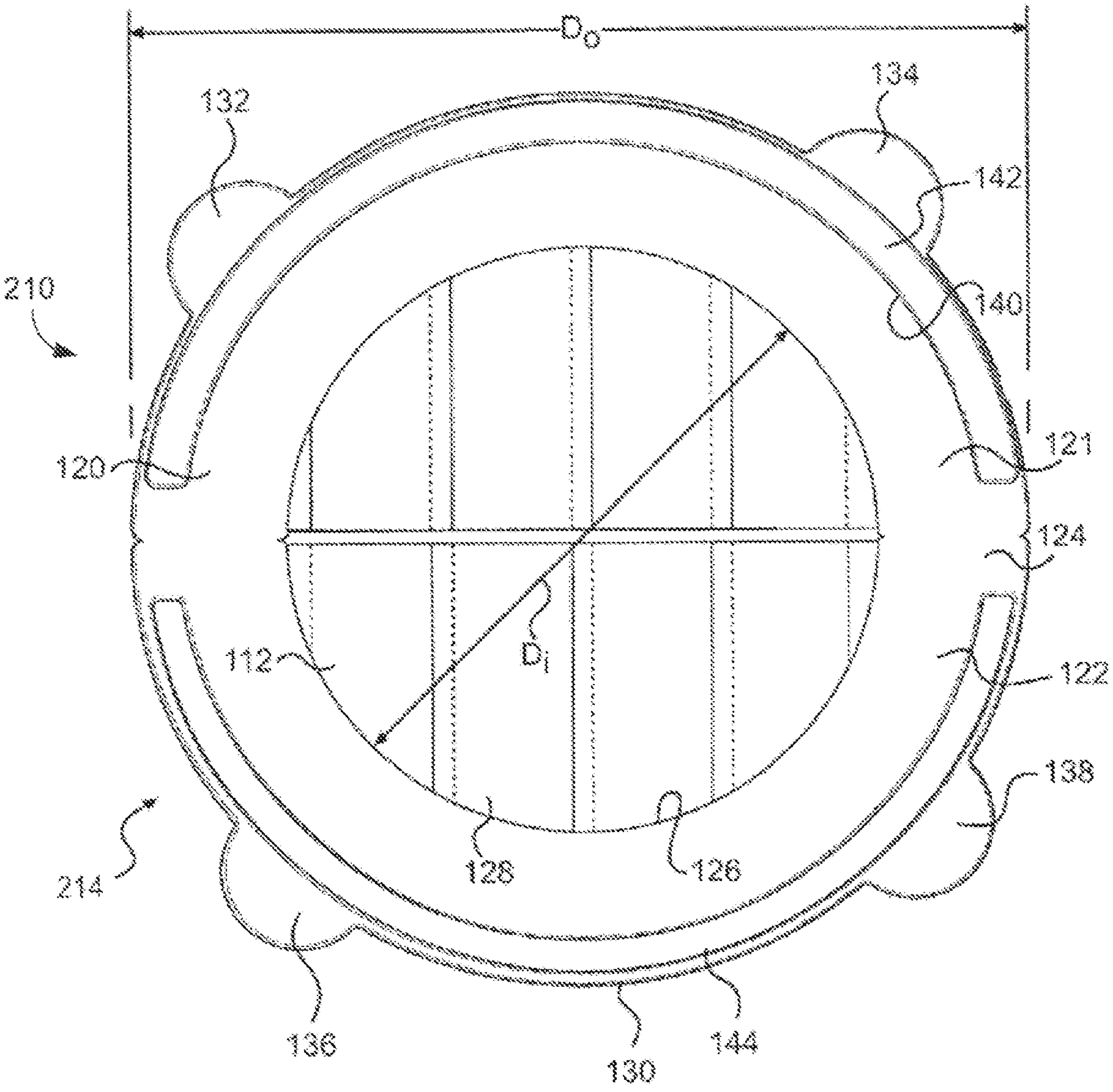
FIG. 14 depicts a top view of the frame structure of the flexible bag used in the pail assembly.

A first support structure 200 is configured to receive the flexible bag assembly being constructed as a single-use bag 210 of a flexible material 212 attached to a frame 120 such as shown in FIG. 14. The frame 120 may be releasably mounted to the first support structure 200 in the housing 12. In position, the first support structure 200 may be constructed to prevent the frame 120 of the flexible bag 210 from rotating inside of the housing 12. The single use bag is described in further detail as FIG. 21 in U.S. Pat. No. 8,833,592, which is incorporated by reference herein in its entirety into this disclosure. For sake of brevity, the physical description of the single use bag will not be repeated again here.

Figure 12A:
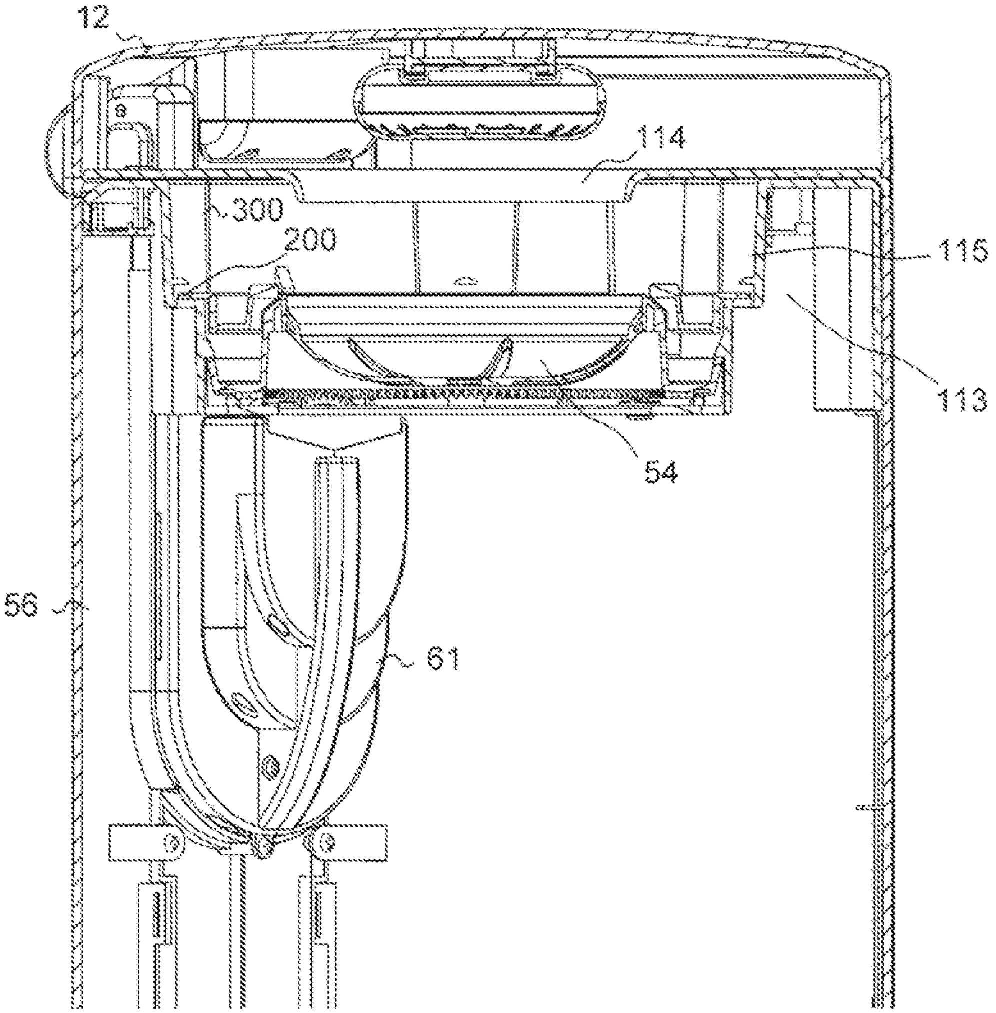
FIGS. 12A and 12B show enlarged cross section and detailed views, respectively, of the first and second support structure in the pail assembly.
Figure 12B:
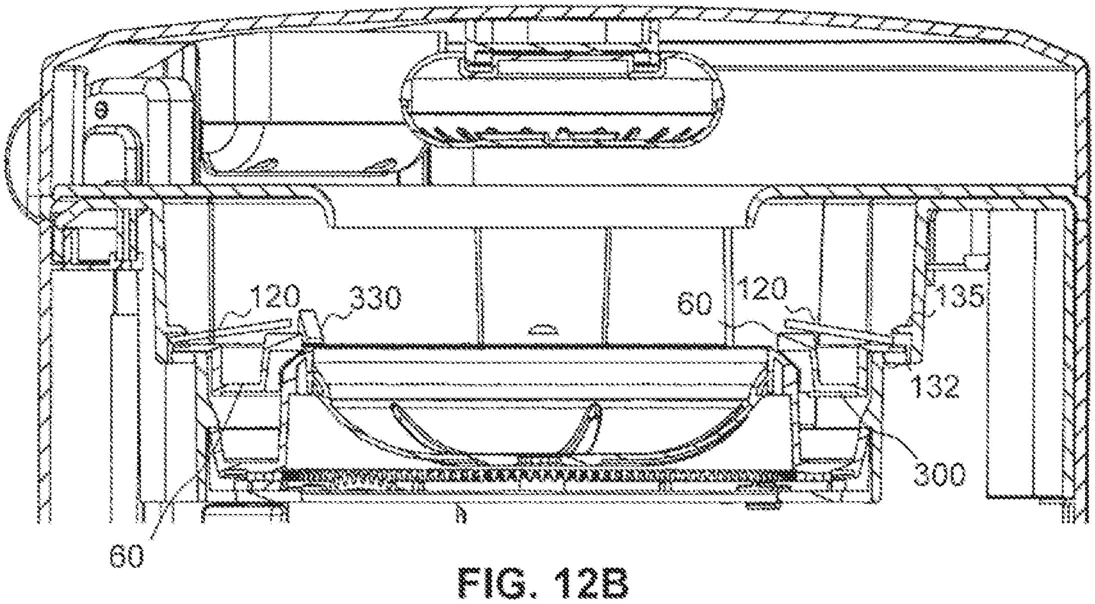
Figure 13:
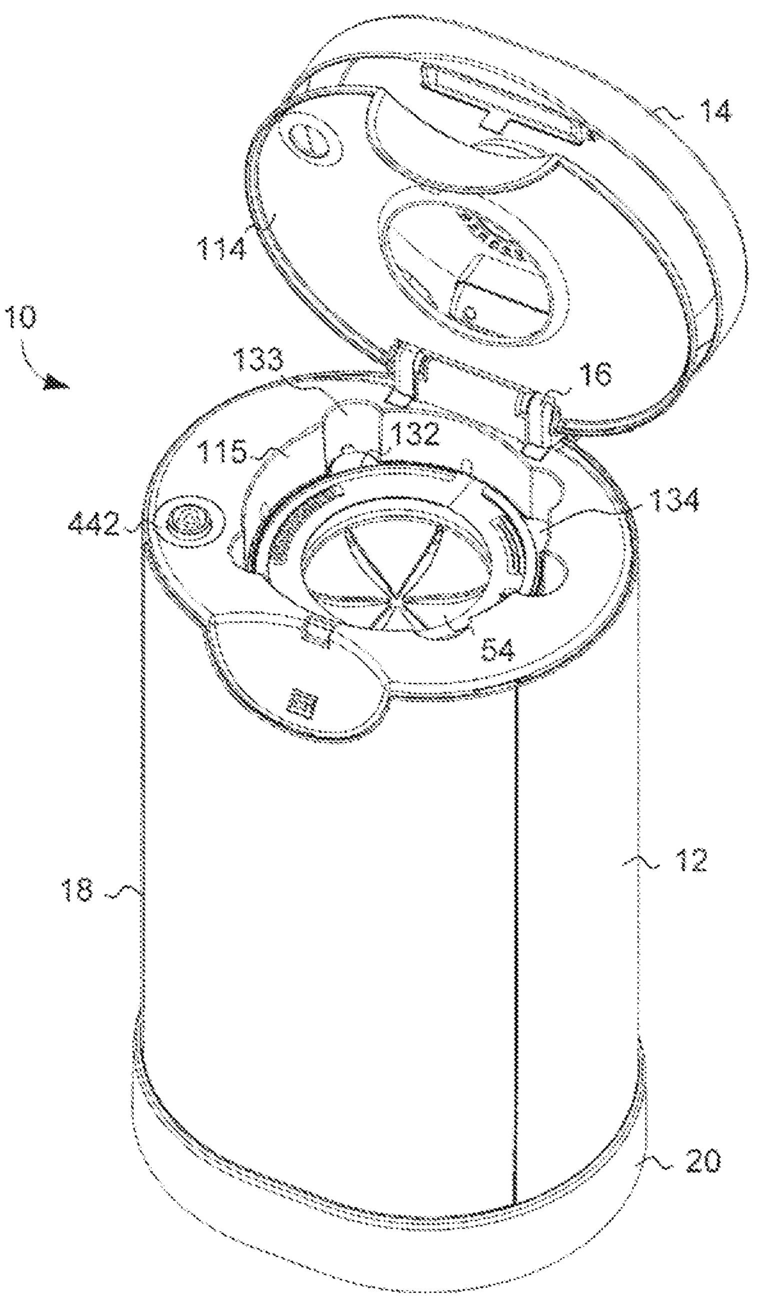
FIG. 13 illustrates a top perspective view of the flexible bag used in the first support structure of the pail assembly.

As shown in FIGS. 12A and B, when the single use bag assembly 210 is interested into the system, an outer edge 120 of the single use bag frame is tucked underneath tabs clips 135 positioned around the annular ring of the waste chamber 113. Only the outer edge 120 of the single use bag assembly 210 is shown in FIG. 12B without further detail of the structure and bag of the single use bag assembly 210 for sake of simplicity in order to show the positioning of the assembly 210 within the tab clips 135. Key projections 60 primarily used in the second support structure 300 serve to lift the outer edge 120 of the single bag assembly 130 such that the top of the key projections 60 act as the seat for bag assembly 210. The frame 120 is secured between in the recess formed underneath tab clips 135. This positioning gives the single use bag assembly 210 a more secure position within the waste chamber 113 and ensures that the bag assembly 210 remains firmly in place whenever further waste is deposited into the bag assembly.

A second support structure 300 is configured to receive the cassette 310 including the packed length of a flexible tubing 312 as shown in FIG. 10. As shown in FIGS. 10 and 18, the flexible tubing 312 is drawn from within the cassette 310 and fed out of the cassette 310 and through the waste chamber 113 and into the storage space 13 while in use. A knot (not shown) may be tied at the lower end of the flexible tubing 312 to construct a closed lower end bag enclosure.

An internal lid 114 is provided between the lid 14 and the housing 12 that opens and closes over the waste chamber 113 as shown in FIGS. 1-2. The internal lid 114 may also utilize the hinge mechanism 16 used to secure the lid member 14 to the housing 12. The internal lid 114 is provided to prevent the flexible tubing 312 of the cassette 310 from being drawn outward from within the cassette 310 and feeding more tubing 312 when an article of waste is pushed into the flexible tubing 312 within the waste chamber 113.

Figure 19A:
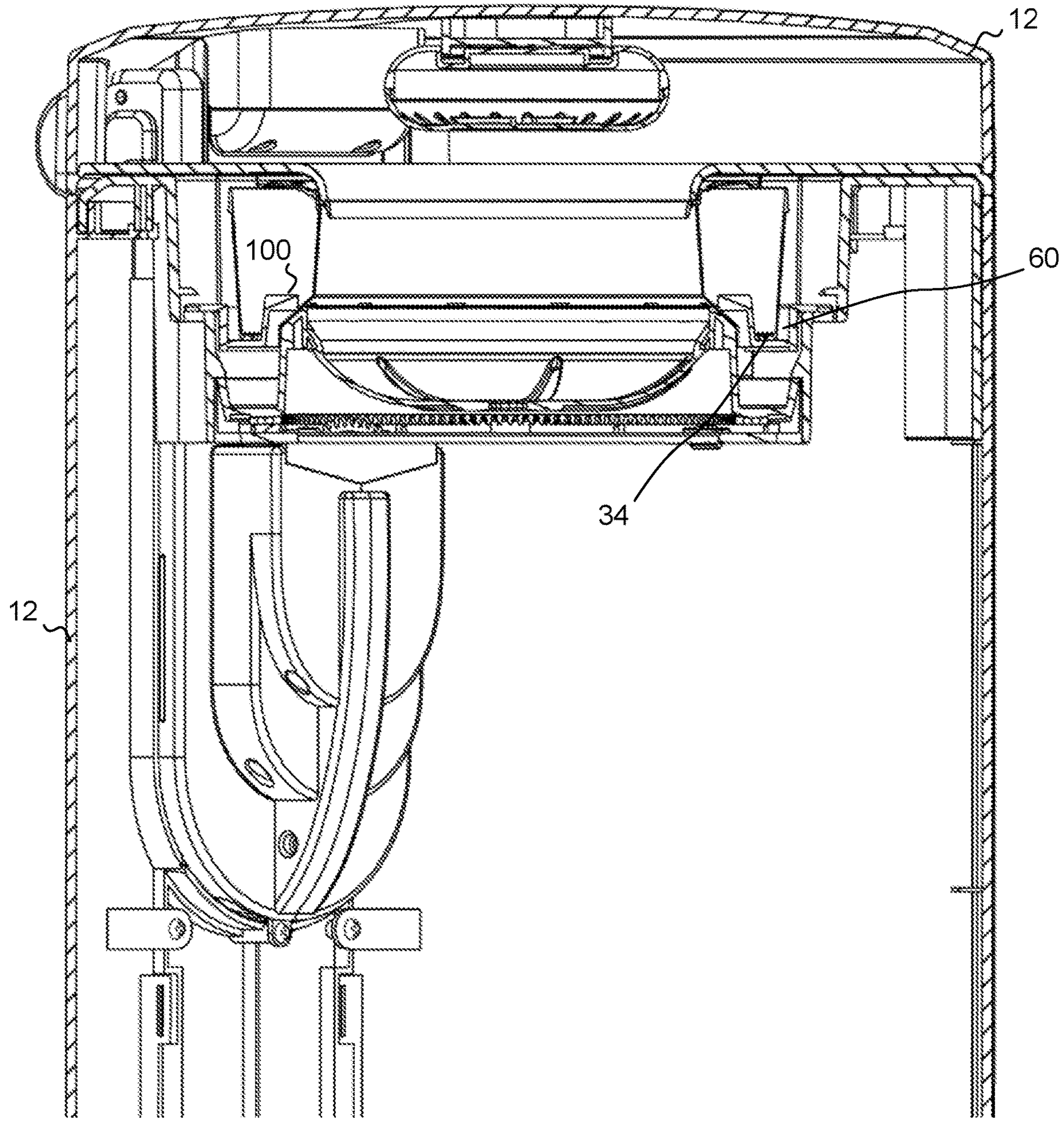
FIGS. 19A-19B show cross section and detailed views, respectively, of the cassette used in the second support structure of the pail assembly.
Figure 19B:
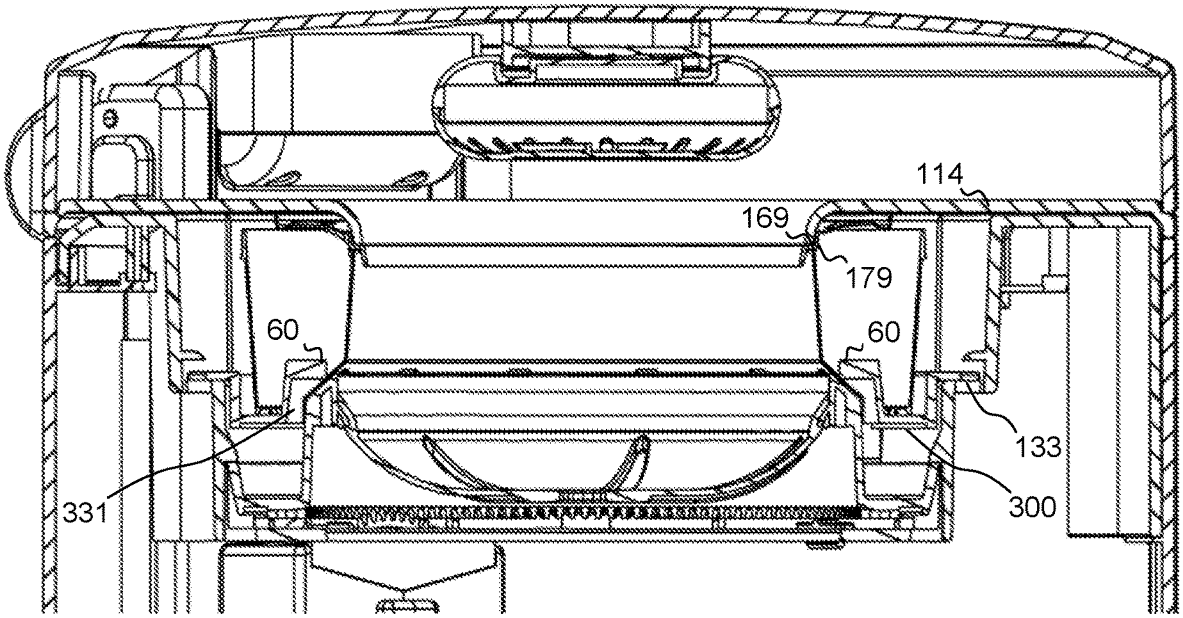

As shown in FIGS. 10, 19A and 19B, the second support structure 300 accommodates the cassette 310 such that the internal apertures 11 on the bottom portion of the cassette 310 receive key projections 60 and essentially lock the cassette 310 in place within the waste chamber 113. Further, when the internal lid 114 is closed, an internal downward projection 169 on the internal lid serves to press down and essentially lock the cassette 310 in position to a degree such that the corresponding interior upper portion 179 of the cassette 310 receives the downward force of the downward projection 169, and secures the cassette in place and presses down on the tube 312 with enough force as to prevent the downward movement of the tube 312 each time further waste is disposed within the container. Upon release of the internal lid 114, the tubing 312 may be pulled out and cut to tie and dispose of the used tubing, as needed. The tubing 312 is then pulled down further to tie a knot and start a subsequent bag 312.

An odor remediating insert 40 attached to the lid 14 of the diaper pail assembly 10 as shown in FIG. 2. The odor remediating insert 40 is used to reduce and eliminate foul odors from emanating from within the housing 12 of the diaper pail assembly 10.

A rotatable sealing and gripping mechanism 54 is provided in the waste chamber 113 as shown in FIG. 1. The rotatable sealing and gripping mechanism 54 has a resilient opening in a flexible material is provided through which the flexible bag may pass though a passage therein.

A transmission mechanism 56 is provide and adapted to rotate the rotatable sealing and gripping mechanism 54. In use, the rotatable sealing and gripping mechanism 54 is rotated by the transmission mechanism 56 causing the rotatable sealing and gripping mechanism 54 to twist a portion of the flexible material to seal the passage of the flexible bag closed. As will be shown in a later embodiment, a foot pedal may be configured and adapted to open or close the lid 14, and/or to engage the transmission mechanism 56 to rotate the rotatable member.

As shown in FIG. 4, the housing 12 defines an interior storage space 13 into which various waste packages are placed and stored in use. The housing 12 can be accessed by a parent or a caregiver by opening a door 18. The door 18 is hingedly mounted at hinge 18A with respect to the housing 12.

The diaper pail assembly 10 includes a base portion 20 that is constructed and arranged to support the housing 12 on an underlying horizontal surface such as a floor or a carpet. The base portion 20 encircles the bottom of the housing 12 and provides the bottom surface for the interior storage space 13.

The base portion 20 includes structure 44 for aligning and centering a diaper pail bag within the interior storage space 13 of the housing 12. The aligning and centering structure 44 includes a bottom surface 46 defining a lowermost extent of the interior storage space 13 that includes a central, substantially flat portion 48 and an annular curved portion 50 surrounding the substantially flat portion 48.

A door latching mechanism may be provided on the door 18 for permitting the consumer to open and close the door 18. The door latching mechanism selectively locks the door 18 in a closed position as shown in FIG. 1A.

Figure 5:
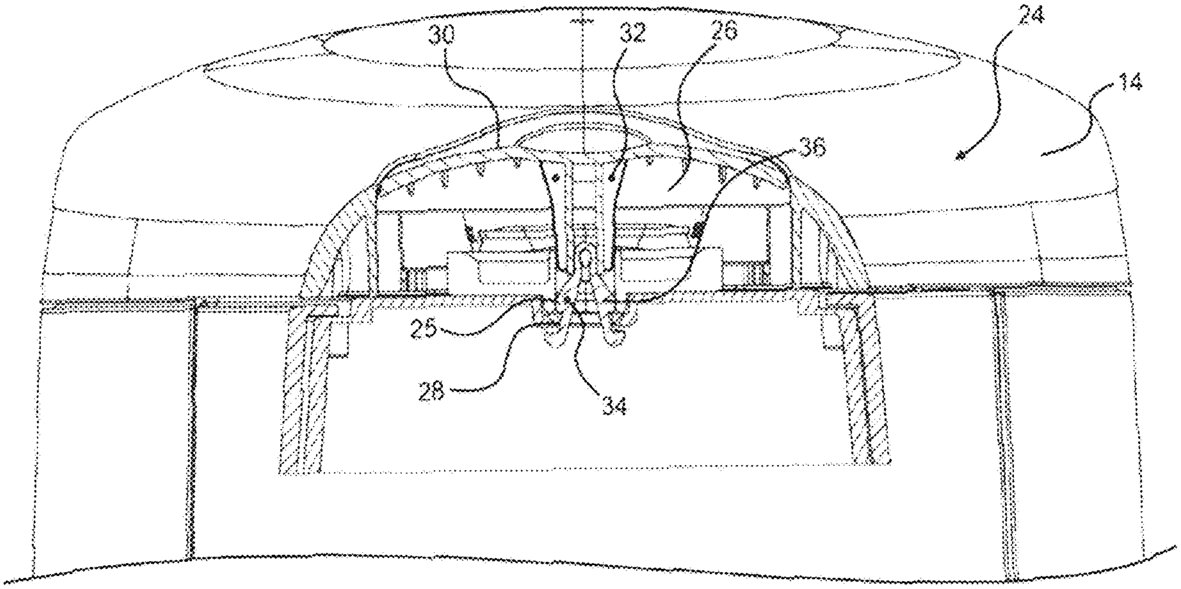
FIG. 5 depicts a cross section of a lid latching mechanism for the lid.

FIG. 5 shows a lid latching mechanism 24 integrated into the lid 14. The lid latching mechanism 24 includes a laterally expandable latch member 26 that is movably mounted on the lid member 14 and a mating recess 28 that is defined in the housing 12. A button or actuating surface 30 is movably mounted on a side of the lid member 14 that is opposite the hinge mechanism 16 so as to permit substantially vertically upward and downward movement with respect to the lid member 14. A slotted plunger member 32 is integral with an underside of the actuating surface 30 and arranged to cam against outer cam surfaces 25 of an opposed pair of pivotally mounted laterally expandable latch members 34, 36 when the actuating surface 30 is depressed by a consumer, Latch members 34, 36 are biased by an internal spring towards the open position that is shown in FIG. 5. The lid latching mechanism 24 is described in further detail as FIG. 4 in U.S. Pat. No. 8,833,592 (hereinafter "'592 patent"), which is incorporated by reference herein in its entirety into this disclosure. For sake of brevity, the physical description of the lid latching mechanism will not be repeated again here.

As shown in FIG. 2, the odor remediating insert 40 is provided on an underside of the lid member 14. The odor remediating insert 40 or a powder dispensing assembly may be incorporated. An exemplary powder dispensing assembly may incorporate the method of operation described in U.S. patent application Ser. No. 12/609,136, filed Oct. 30, 2009, the entire disclosure of which is hereby incorporated by reference as if set forth fully herein.

When a user desires to open the lid member 14 of the diaper pail assembly 10 in order to install a diaper pail bag or dispose an odiferous waste package such as a used disposable diaper, the user may depress an actuator button 30 (such as shown in the '592 patent), which will drive the plunger 32 downwardly, causing the plunger 32 to contact the outer cam surfaces 25 of the respective latch members 34, 36. This will cause the latch members 34, 36 to disengage from the recess 28 and enable the lid member 14 to be lifted upwardly.

As shown in FIG. 1A, an undercut 31 or recess is preferably defined in the housing 12 on an opposite side of housing 12 from the hinge mechanism 16 in order to give the consumer space to be able to exert lifting pressure on a lifting surface of the lid member 14. This will enable a user to easily lift the lid member 14 after the lid latching mechanism 24 has been disengaged.

FIGS. 1-2 depict the internal lid 114 that pivots about the hinge mechanism 16. FIG. 1 depicts the internal lid 114 in an open position and FIG. 2 depicts the internal lid 114 in a closed position. In the closed position, the internal lid 114 is adapted to secure the flexible tubing from extending into the interior storage space 13 within the housing 12. The internal lid 114 does this by pressing down onto the tubing of a flexible diaper pail bag 212 and preventing the flexible tubing from being drawn from within the cassette when a user pushes a waste article into the flexible diaper pail bag 212 as discussed elsewhere.

A rotatable sealing and gripping member 54 is provided in the diaper pail assembly 10. The rotatable sealing and gripping member 54 is constructed and arranged to create a restricted portion within the flexible diaper pail bag 212 in order to provide a temporary odor seal. This is accomplished by gripping and twisting the flexible diaper pail bag 212 in order to provide a temporary seal, as will be described in greater detail below. Alternatively, the restricted portion of the flexible diaper pail bag 212 could be created by pinching or folding a portion of the flexible bag 212 instead of by twisting it.

A transmission mechanism 56 is provided for causing rotation of the rotatable sealing member 54 for a predetermined rotational distance when the lid . . . member 14 is moved from the open position shown in FIG. 1 to the closed position shown in FIG. 3. The transmission mechanism 56 includes a push rod member 58, visible in FIGS. 6-7 and 38-43, that is caused and constrained to slide linearly downwardly when the lid member 14 is closed and linearly upwardly when it is opened. The transmission mechanism 56 is designed so as not to cause any movement of the rotatable sealing member 54 when the lid member 14 is pivoted upwardly from the closed position to the open position.

Figure 6:
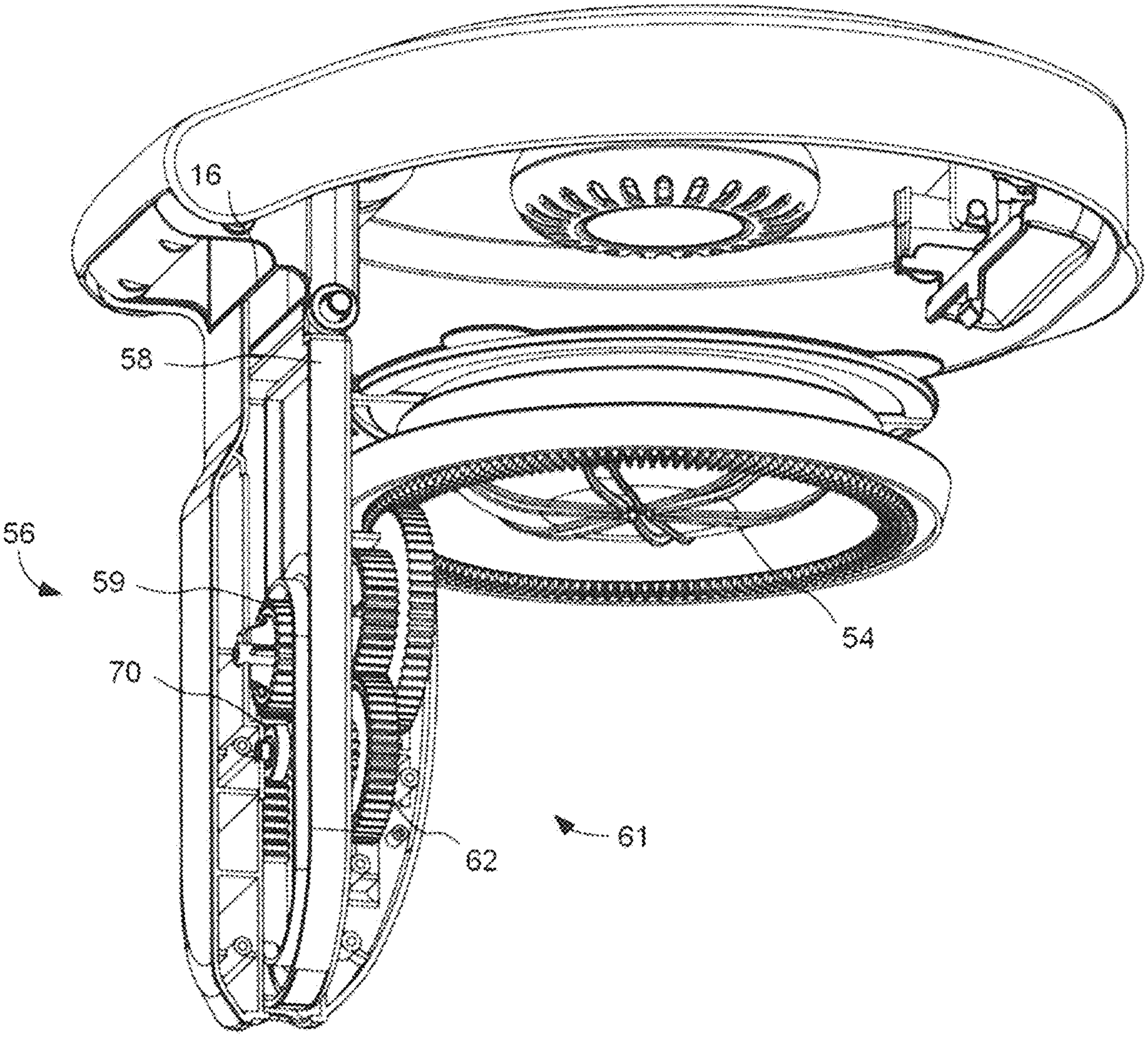
FIG. 6 shows a partial perspective cut away view of the transmission mechanism of the pail assembly.
Figure 7:
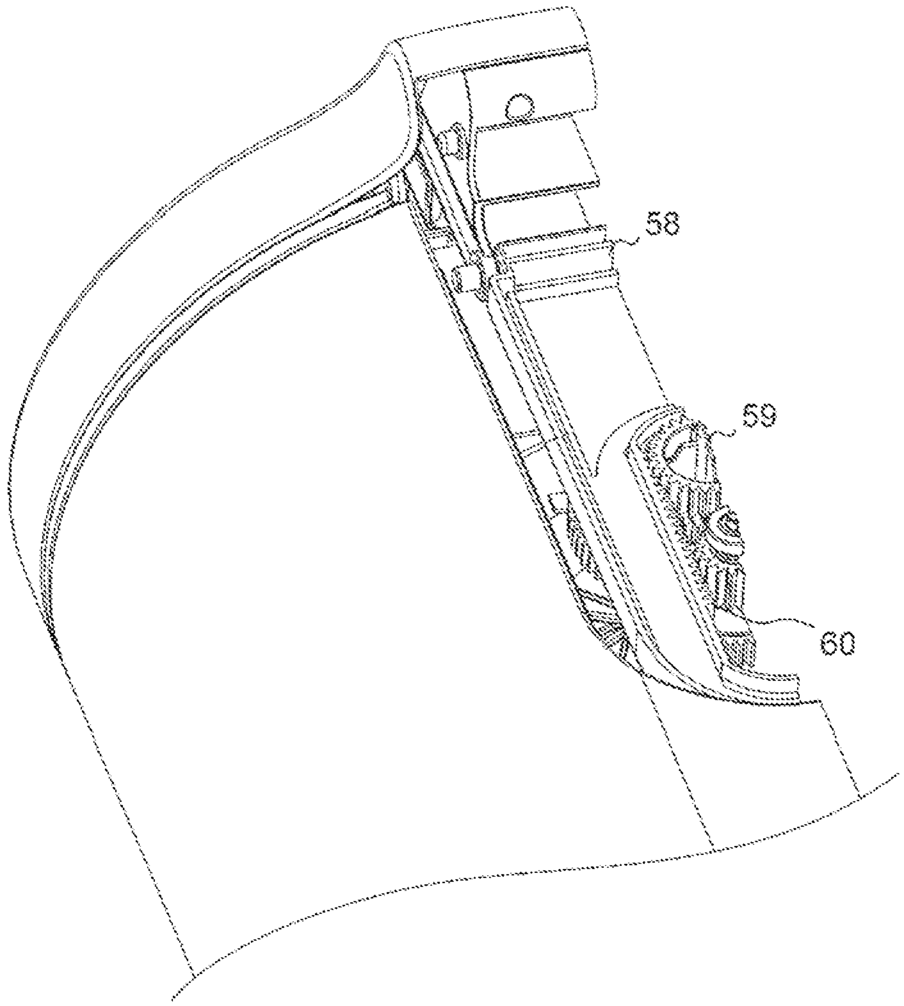
FIG. 7 illustrates another partial perspective cut away view of the transmission mechanism of the pail assembly.
Figure 8:
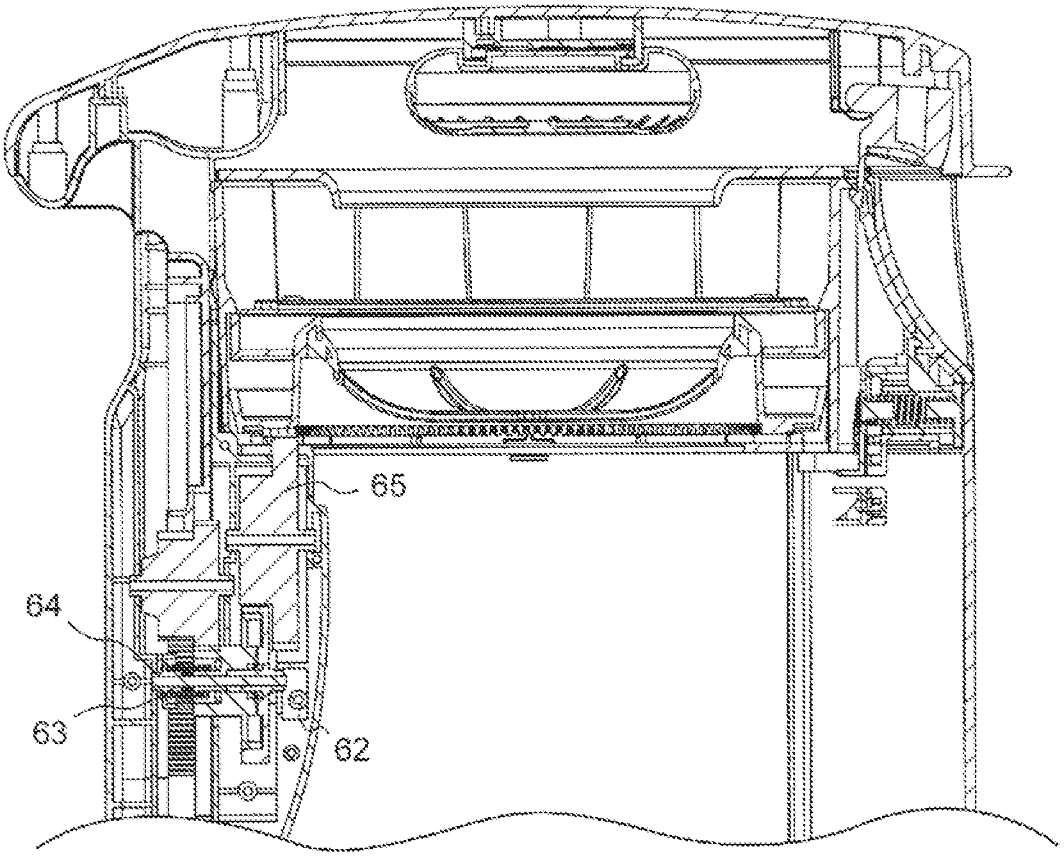
FIG. 8 depicts a partial cross section cut away view of the transmission mechanism of the pail assembly.

The push rod member 58 of the transmission mechanism 56 includes a toothed rack portion 60 as shown in FIG. 6. The push rod member 58 permits vertical movement thereof with respect to the housing 12 by a slotted channel within the internal housing frame 70. A rack engaging gear 59 is mounted for rotation with respect to the internal housing frame 70 in such a manner that it is permitted a limited amount of vertical movement with respect to the internal housing frame 70. Rack engaging gear 59 has teeth that are operatively engaged with corresponding teeth on the toothed rack portion 60 when the rack engaging gear 59 is in its lowermost vertical position. The transmission mechanism 56 is described in further detail as FIG. 12 in the '592 patent, which is incorporated by reference herein in its entirety into this disclosure. For sake of brevity, a detailed physical description of the transmission mechanism will not be repeated again here. However, such a mechanism is used herein for the movement of the sealing member 54.

Figure 9:
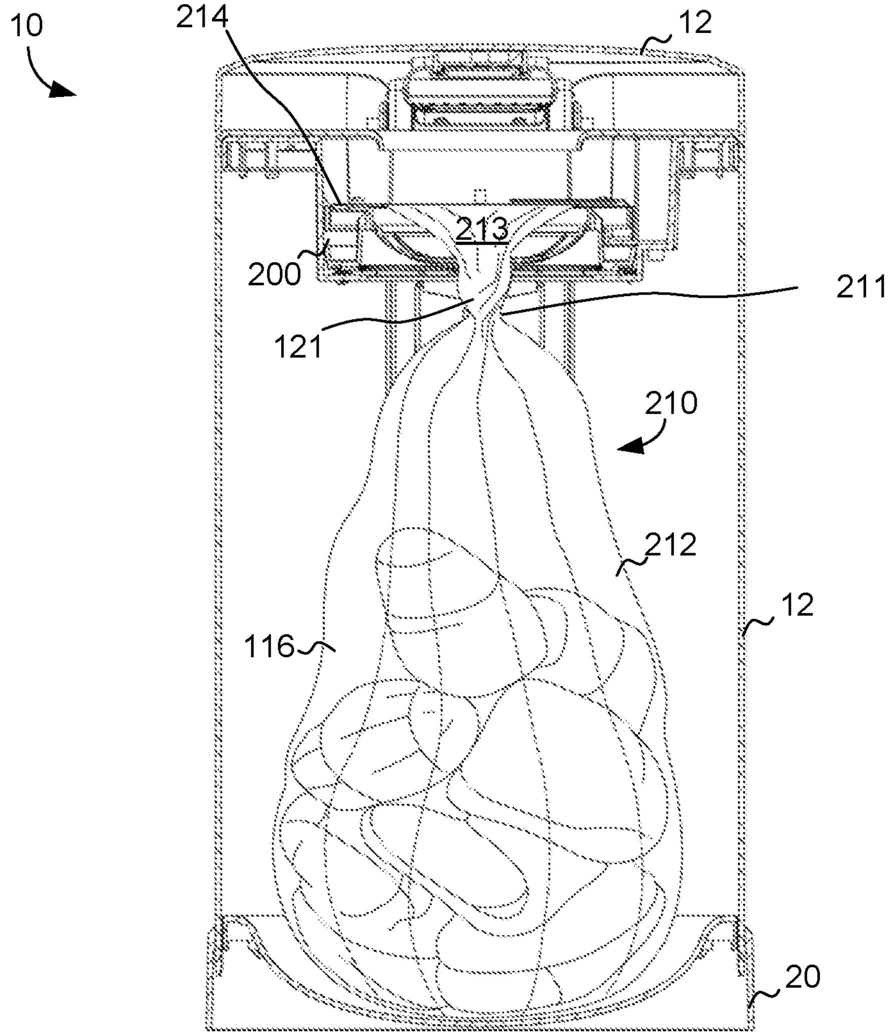
FIG. 9 shows a cross section view of the flexible bag used in the pail assembly.
Figure 10:
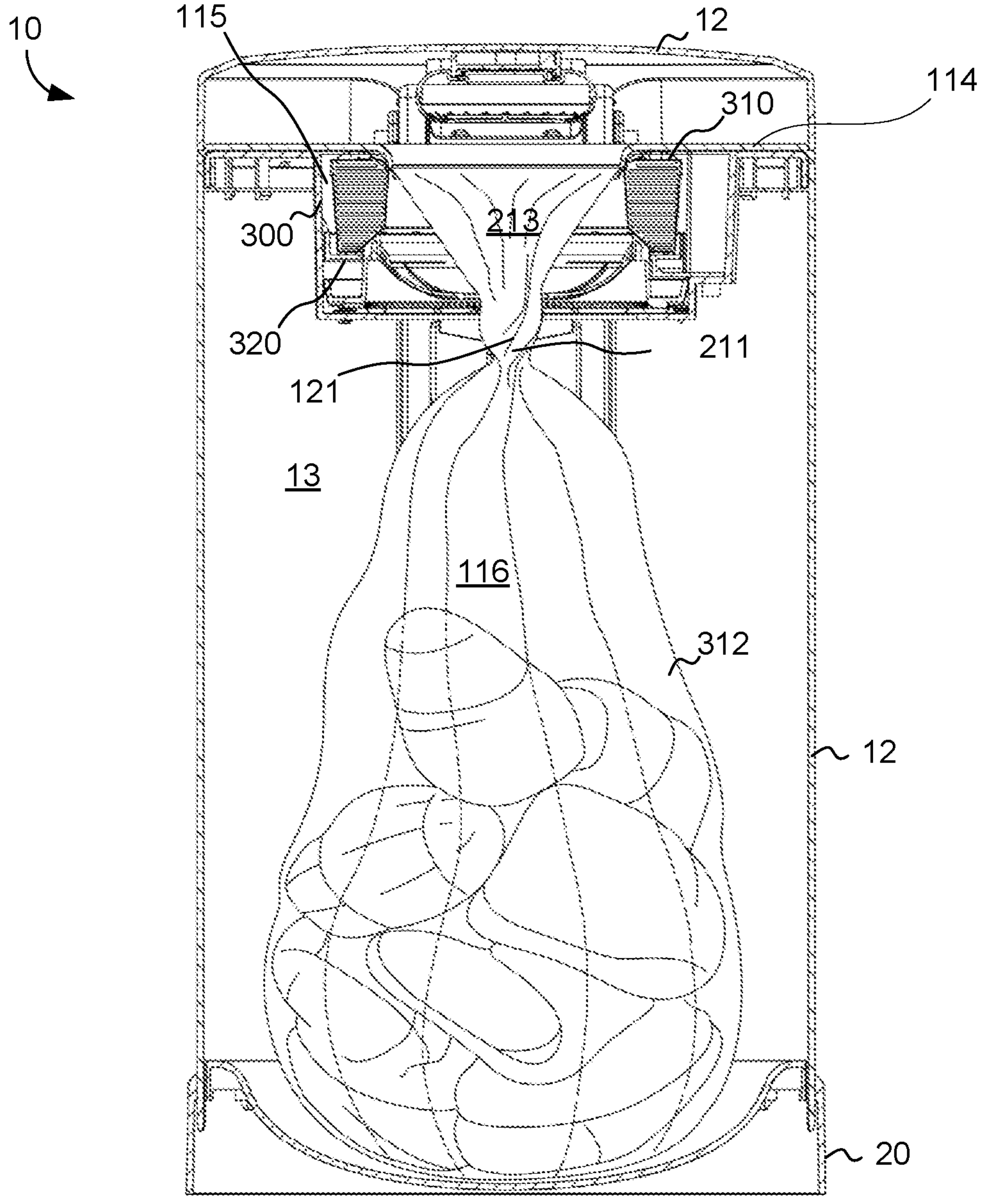
FIG. 10 illustrates a cross section view of the cassette used in the pail assembly.

As shown in FIG. 9, when the lid member 14 is pivoted downwardly by a user from the open position that is shown in FIG. 1 to the closed position that is . . . shown in FIG. 3, the push rod member 58 (seen in FIGS. 6-7 and 38-43) will be driven downwardly and the rotatable flexible bag retaining and sealing member 54 will be driven by the gear train mechanism 61 to rotate for the predetermined angular distance, thereby creating a twisted portion 121 in an intermediate portion 211 of the flexible bag 110 that is between a lower or bottom portion 116 and an upper portion 213. This is diagrammatically shown in FIGS. 9 and 10 for the use with the flexible bag 212 in the first support structure 200, or for use with the flexible tubing 312 drawn from the cassette 310 provided in the second support structure 300.

Figure 11:
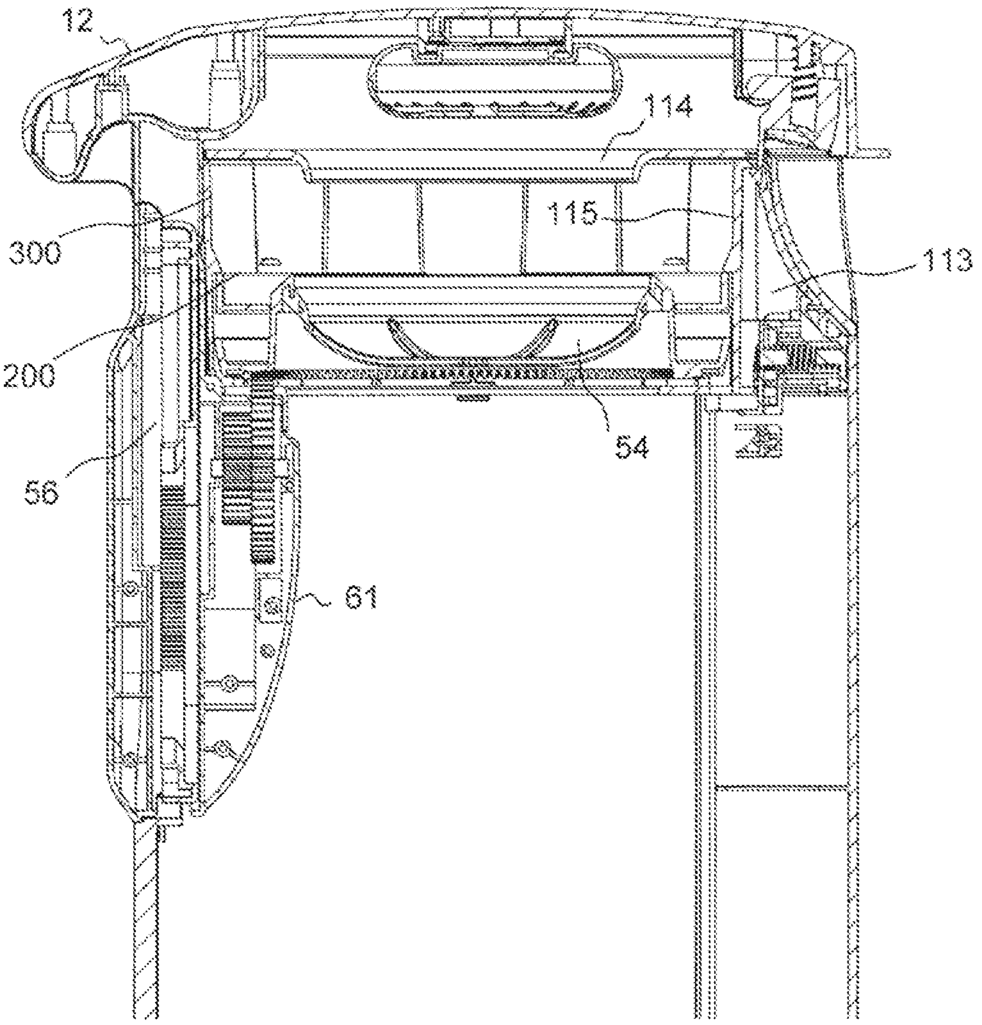
FIG. 11 depicts an enlarged cross section view of the first and second support structure and transmission assembly in the pail assembly.

FIGS. 6, 11 and 12 show the interconnection between the rotatable sealing and gripping member 54, the transmission mechanism 56 and the gear train mechanism 61. The gear train mechanism 61 is operatively interconnected when the push rod member 58 moves downwardly, because the rack engaging gear 59 is in its lowermost vertical position and operatively engaged with the second compound gear 62. However, when the lid member 14 is pivoted upwardly from the closed position to the open position, the rack engaging gear 59 is lifted upwardly out of engagement with the second compound gear 62. Accordingly the gear train mechanism 61 will be disengaged and there will be no rotation of the flexible bag retaining and sealing member 54 when the lid member 14 is opened, which allows the twisted flexible bag 212 to remain closed.

A clutch mechanism is provided in the event that the gear train mechanism becomes jammed. Internal forces within the gear train mechanism will cause the clutch mechanism to permit a relative amount of relative movement between the first gear portion and the second gear portion of the second compound gear. The clutch mechanism may include two relatively slidable components that are biased together by a spring member which is operatively interposed between the second compound gear and the internal housing frame.

The diaper pail assembly 10 is versatile in that various flexible bag assemblies 210, 310, etc. may be used therein. That is, at least shown herein, a single-use flexible bag 212 may be used in combination with the first support structure 200 as shown in FIG. 9. Alternatively, a cassette 310 including a length of flexible tubing 312 may be used in combination with the second support structure 300 as shown in FIG. 10.

The first support structure 200 is constructed within the waste chamber 113 as shown in FIGS. 1, 9 and 13-14. Within the waste chamber 113, a cylindrical recess 115 is provided within the housing 12 to define an inner housing into which the flexible bag 212 or the cassette 310 may be disposed. The cylindrical recess 115 includes a plurality of recesses 133 into which radially outwardly extending projections 132, 134, 136, 138 of the frame 214 of the flexible bag 210 may be registered and secured during use. The outwardly extending projections 132, 134, 136, 138 of the frame 214 are shown in FIG. 14. The plurality of recesses 133 in the housing 12 receive the respective projections 132, 134, 136, 138 in such a manner that the bag frame 214 is secured against rotation relative to the cylindrical recess 115 within the housing 12. The bag frame 214 is securely oriented and aligned in a horizontal position, such as shown in FIG. 9, . . . when the projections 132, 134, 136, 138 are received within the respective recesses 133.

The first support structure 200 is positioned at the lower end of the cylindrical recess 115 and includes tab clips 135 in each of the respective recesses 133 for releasably locking the respective projection 132, 134, 136, 138 within the respective recess 133. The tab clips 135 may be fabricated from a substantially rigid plastic material and are integral with the housing 12 of the diaper pail assembly 10.

Figure 15:
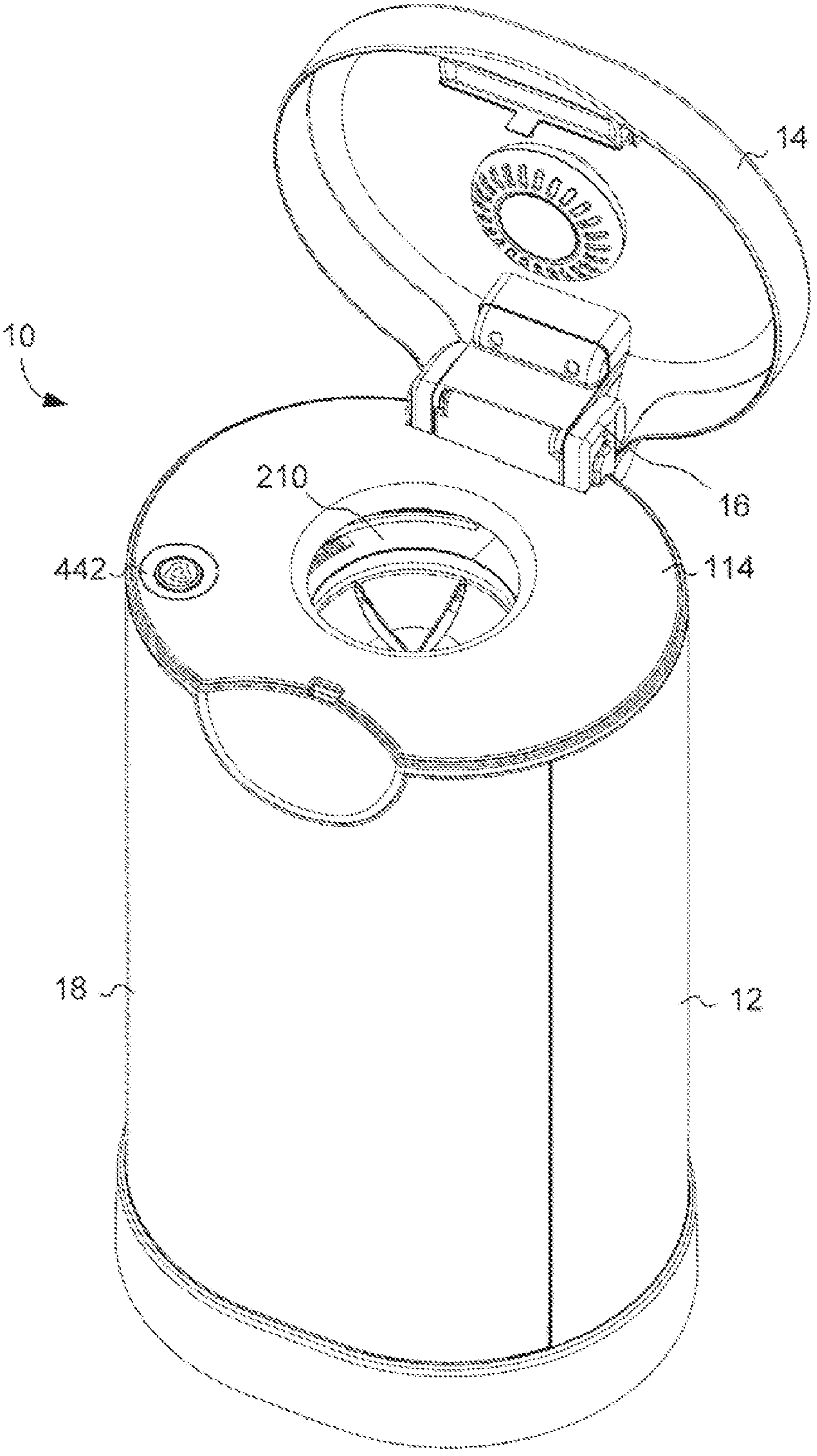
FIG. 15 shows a top perspective view of the pail assembly with the internal lid disposed over the housing.

In use, the bag frame 214 of the flexible bag 210 is sufficiently flexible to permit the user to manipulate the bag frame 214 into and out of the secured position. Each of the projections 132, 134, 136, 138 on the bag frame 214 are positioned beneath the respective tab clips 135 and secured in place. The flexible material 212 of the flexible bag 210 is pushed through the rotatable sealing and gripping mechanism 54 such that the majority of its volume is disposed in the interior storage space 13 within the chamber 12 as shown in FIG. 9. As shown in FIG. 15, the internal lid 114 is closed over the waste chamber 113 and an item of waste can be pushed through the twist 121 formed in the flexible material 212 of the flexible bag 210.

The second support structure 300 is also defined by the cylindrical recess 115 within the waste chamber 113. The walls of the cylindrical recess 115 define the outer boundary for the cassette 310 such as shown in FIG. 10. As shown in FIGS. 10 and 18, the flexible tubing 312 is drawn from within the cassette 310 and fed out of the cassette 310 and through the rotatable sealing . . . and gripping mechanism 54 while in use. A knot may be tied at the lower end of the flexible tubing 312 to construct a closed lower end bag enclosure to seal off the lower end of the flexible tubing 312 to form a container.

Figure 16:
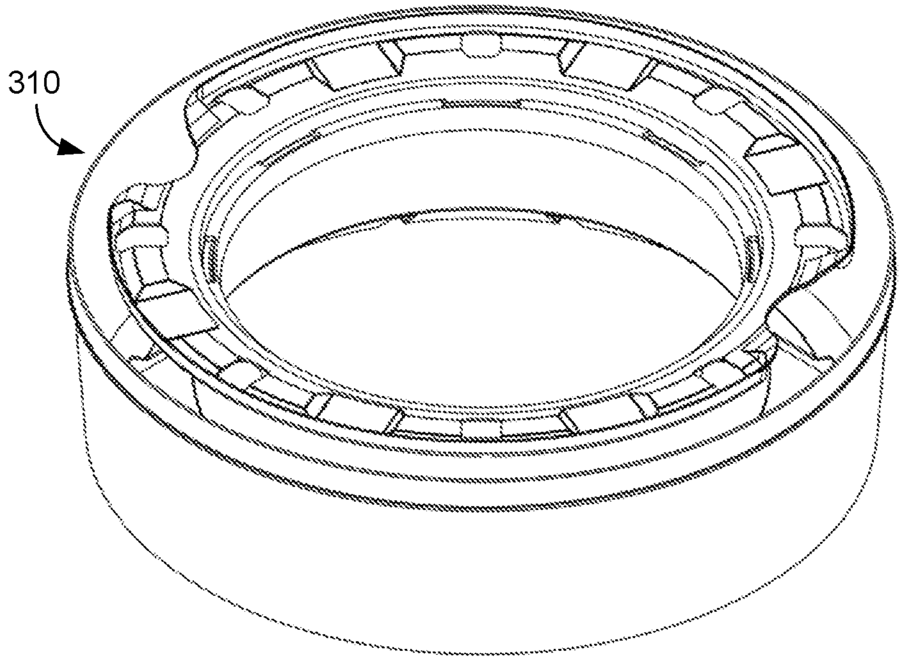
FIGS. 16-18 illustrate a top, bottom and cross section view of an exemplary cassette.
Figure 17:
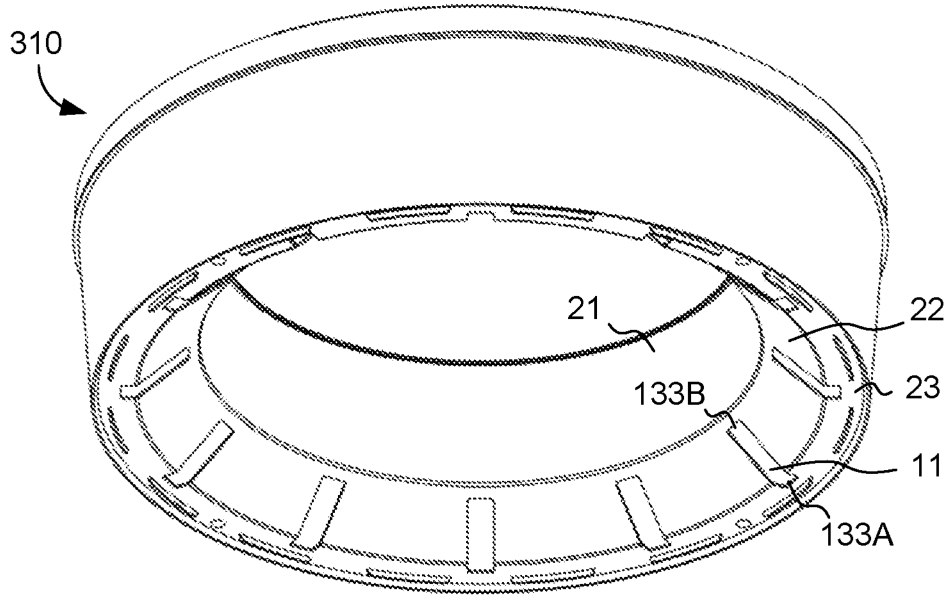

An exemplary cassette 310 that may be used in the diaper pail assembly 10 is shown in top and bottom perspective view in FIGS. 16-17, and side cross section view in FIG. 18. The cassette for dispensing pleated tubing may be provided as described in U.S. patent application Ser. No. 62/078,915, filed Nov. 12, 2014, or the cassette as described in U.S. patent application Ser. No. 13/688,139, filed Nov. 28, 2014, the entire disclosure of which are hereby incorporated by reference as if set fourth fully herein.

FIGS. 16-18 depict upper and lower perspective views of the cassette 310 into which a pleated flexible tubing 312 is received, as shown in FIG. 18. A plurality of apertures 11 is disposed in a radial configuration at the lower end of the cassette 310. As shown, the apertures 11 may be elongated, radially extending inwardly lengthwise from a first end 133*a* disposed in a bottom wall 23, to a second end 133*b* inwardly extending adjacent to the intersection of the angular wall 22 and the inner wall 21. The apertures 11 may be cut into the angular wall 22 and the bottom wall 23 and disposed concentrically about in a radial pattern.

The apertures 11 provide various advantages. First, during installation of the air-tight packing of the flexible packed tubing 312 into the U-shaped lower annular body of the cassette 310, the various apertures 11 serve as vent holes allowing air trapped below the packed tubing to vent out of the lower annular body through the apertures 11.

Alternatively, another significant advantage to the apertures 11 is the ability to control the rotation of the cassette 310. For example, FIGS. 1B and 19B show the apertures 11 functioning as key holes into which a mating key 60 may be aligned and disposed. The key 60 is attached to a portion of the housing 12. As shown, a laterally extending portion of a support structure attached to the housing 12 includes an upwardly projecting key 60 that mates with at least one of the apertures 11. In position within the second support structure 300, the key 60 positioned within one of the apertures 11 prevents the cassette 310 from being rotated while is use. The key 60 is constructed to be aligned to mate with at least one of the apertures 11. The key 60 may engage any portion of the aperture 11 and cause the cassette 310 to rotate, or prevent the cassette 310 from rotating by arresting the movement of the cassette 310.

Figure 20:
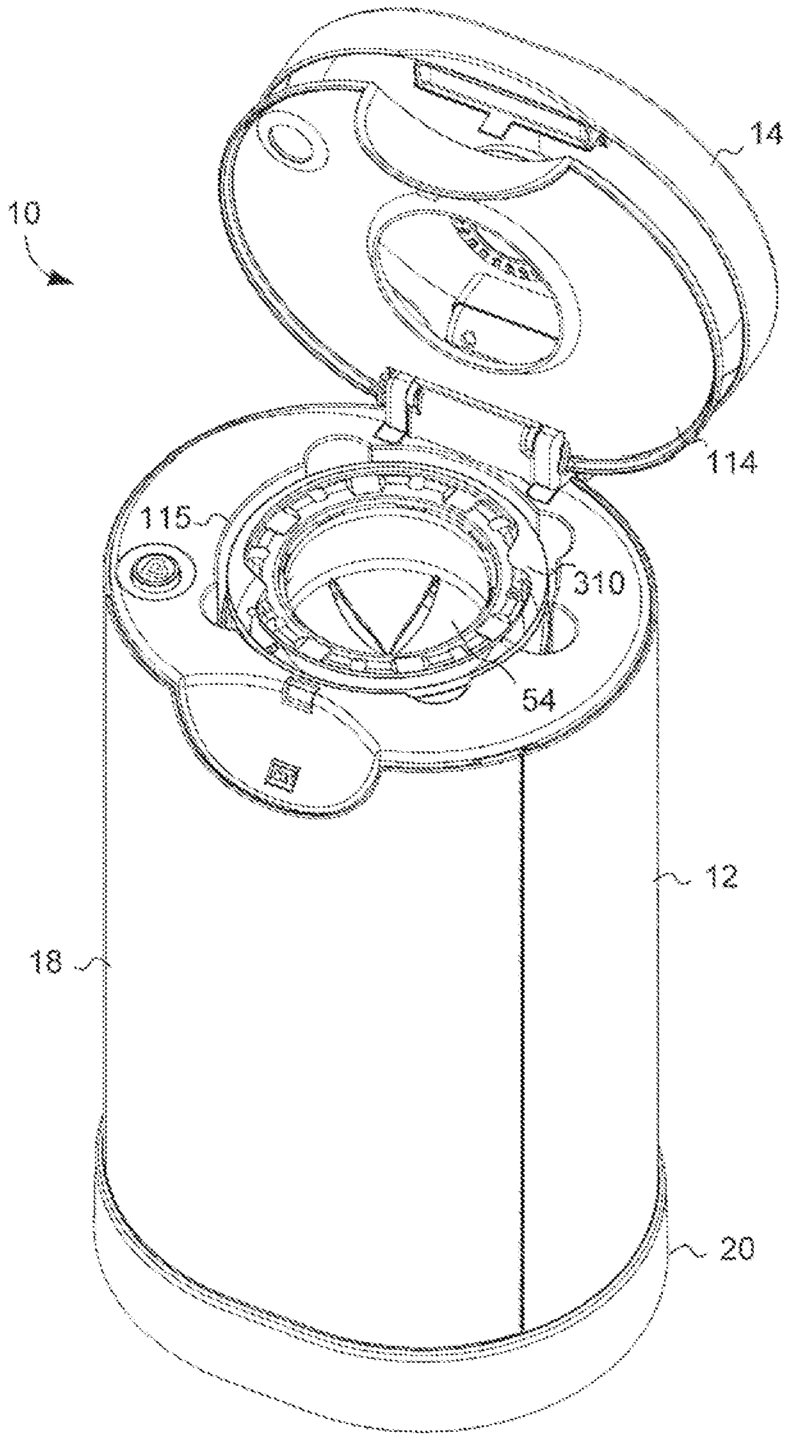
FIG. 20 shows a top perspective view of the cassette positioned within the second support structure of the pail assembly.
Figure 21:
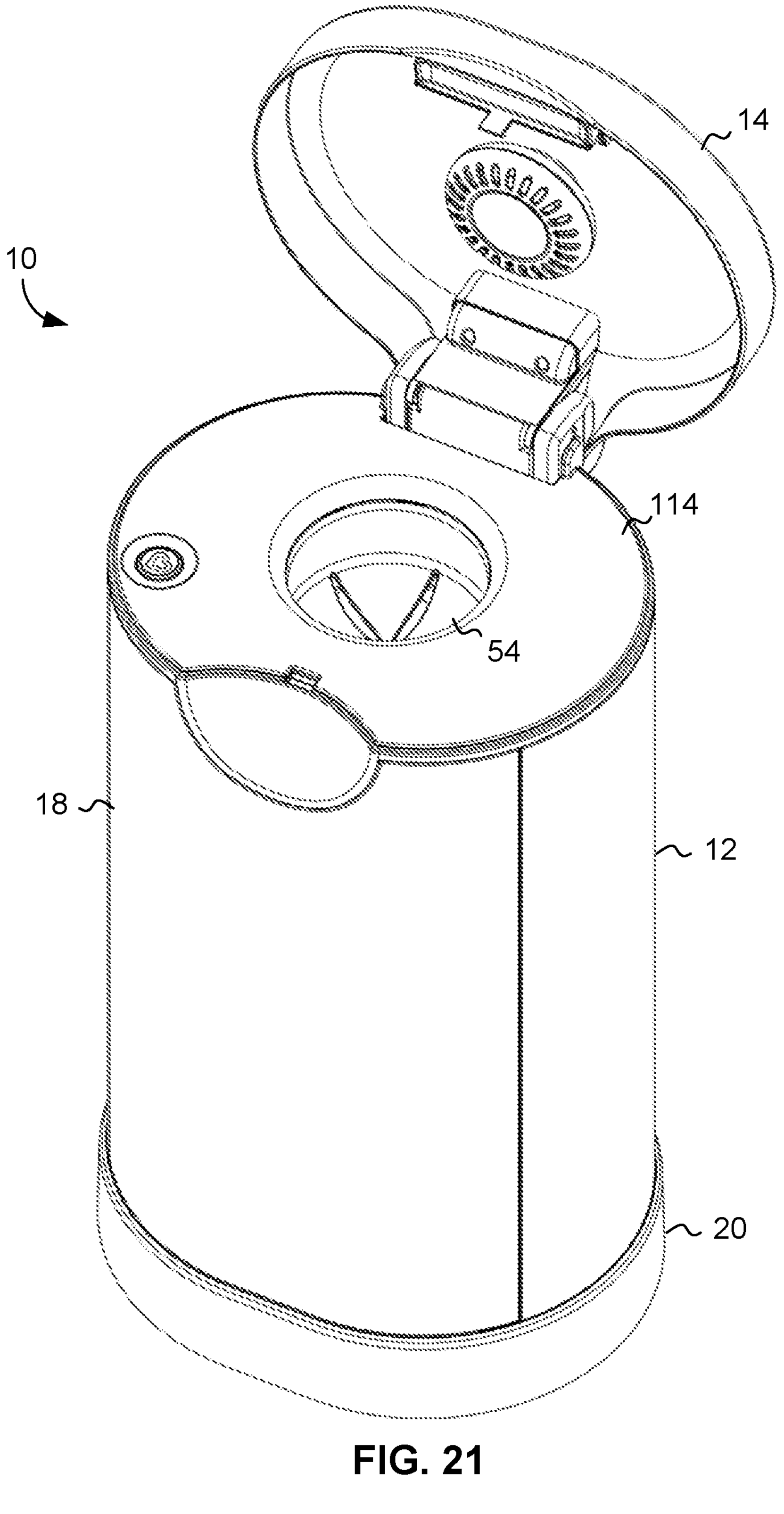
FIG. 21 illustrates a top perspective view of the cassette positioned within the second support structure and the internal lid of the pail assembly.

In use, the cassette 310 is positioned within the cylindrical recess 115 of the housing 12 such as shown in FIG. 20. In position, the protruding key 60 of is aligned with and inserted into at least one aperture 11. The internal lid 114 is locked into position over the cassette 310 and the flexible tubing 312 is secured in position as shown in FIG. 21.

Figure 22:
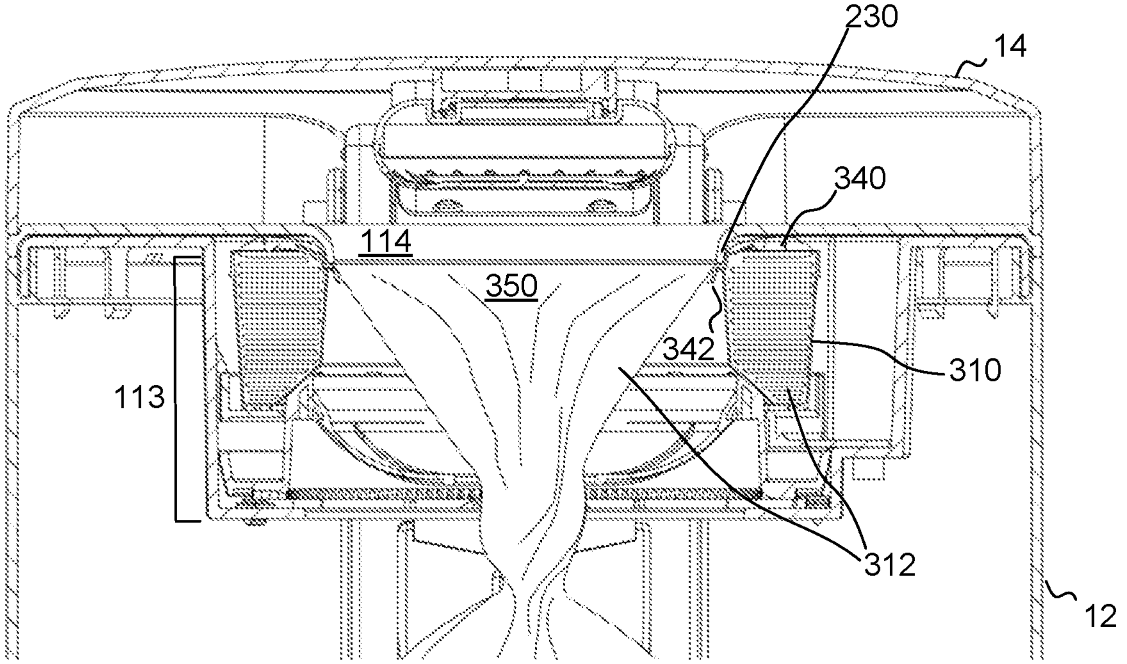
FIG. 22 depicts an enlarged cross section view of the cassette positioned within the second support structure of the pail assembly.
Figure 23:
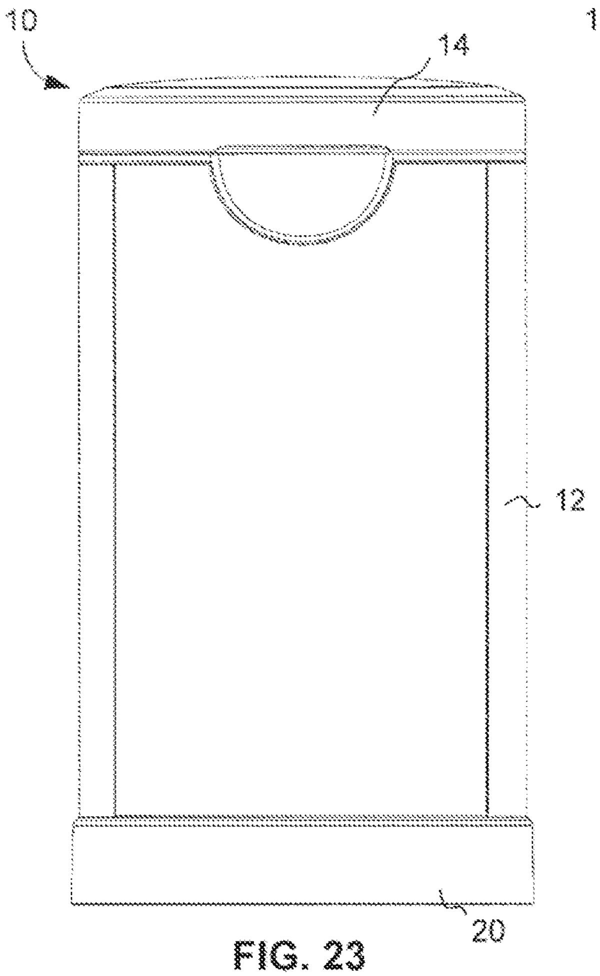
FIG. 23 shows a front view of the pail assembly.
Figure 24:
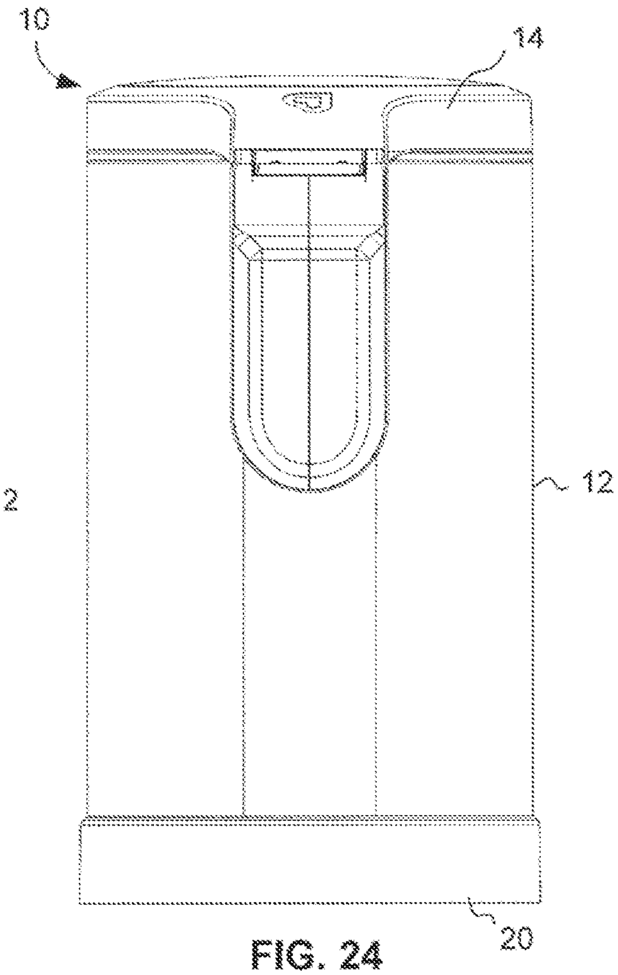
FIG. 24 illustrates a rear view of the pail assembly.
Figure 25:
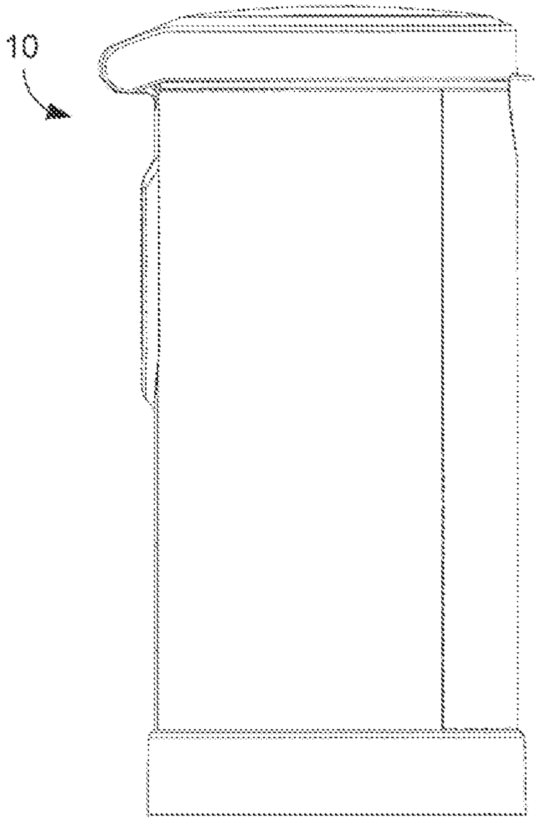
FIGS. 25-28 depict a left, a right, a top and bottom view of the pail assembly.
Figure 26:
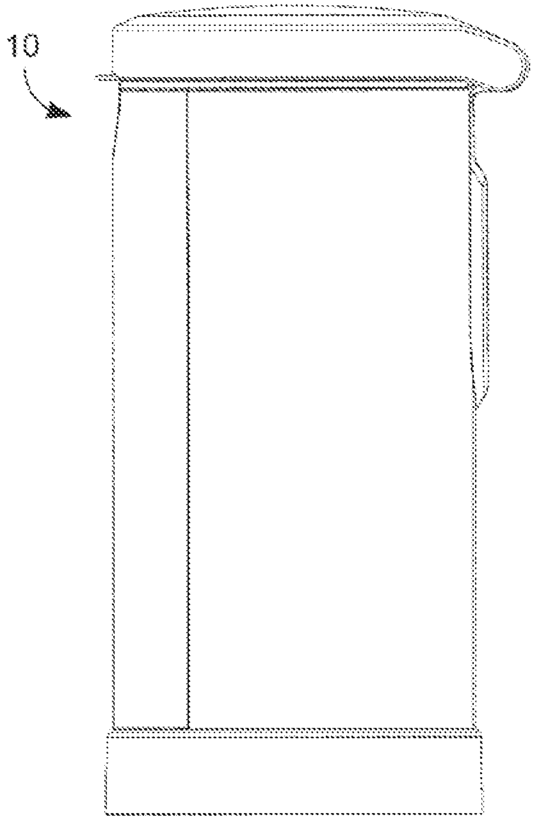
Figure 27:
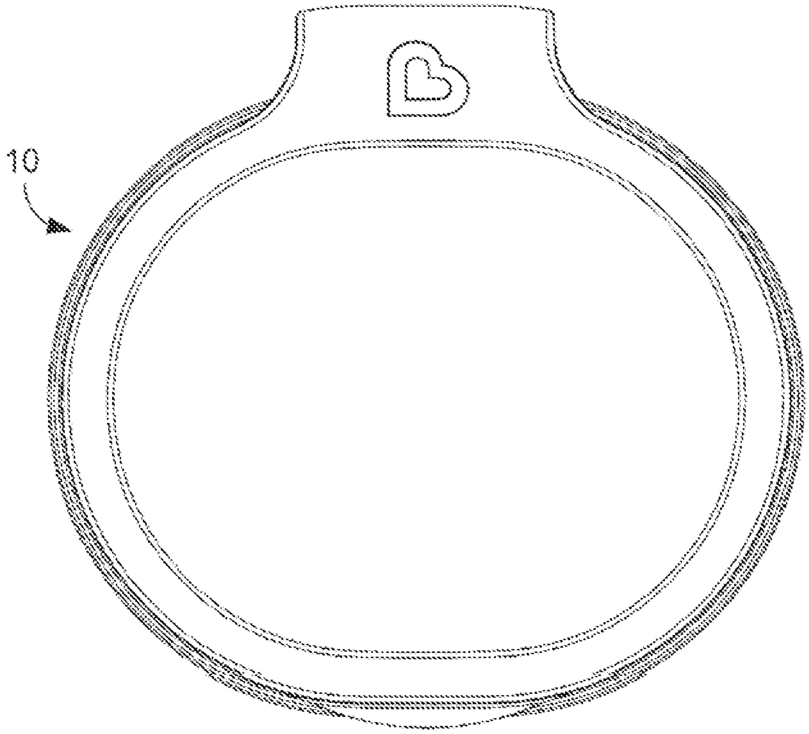
Figure 28:
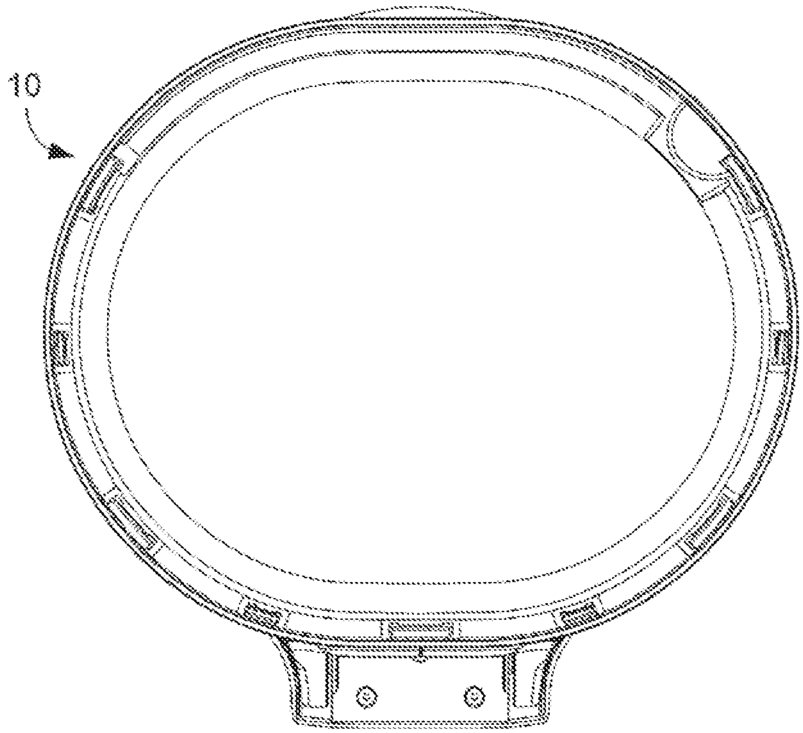
Figure 29:
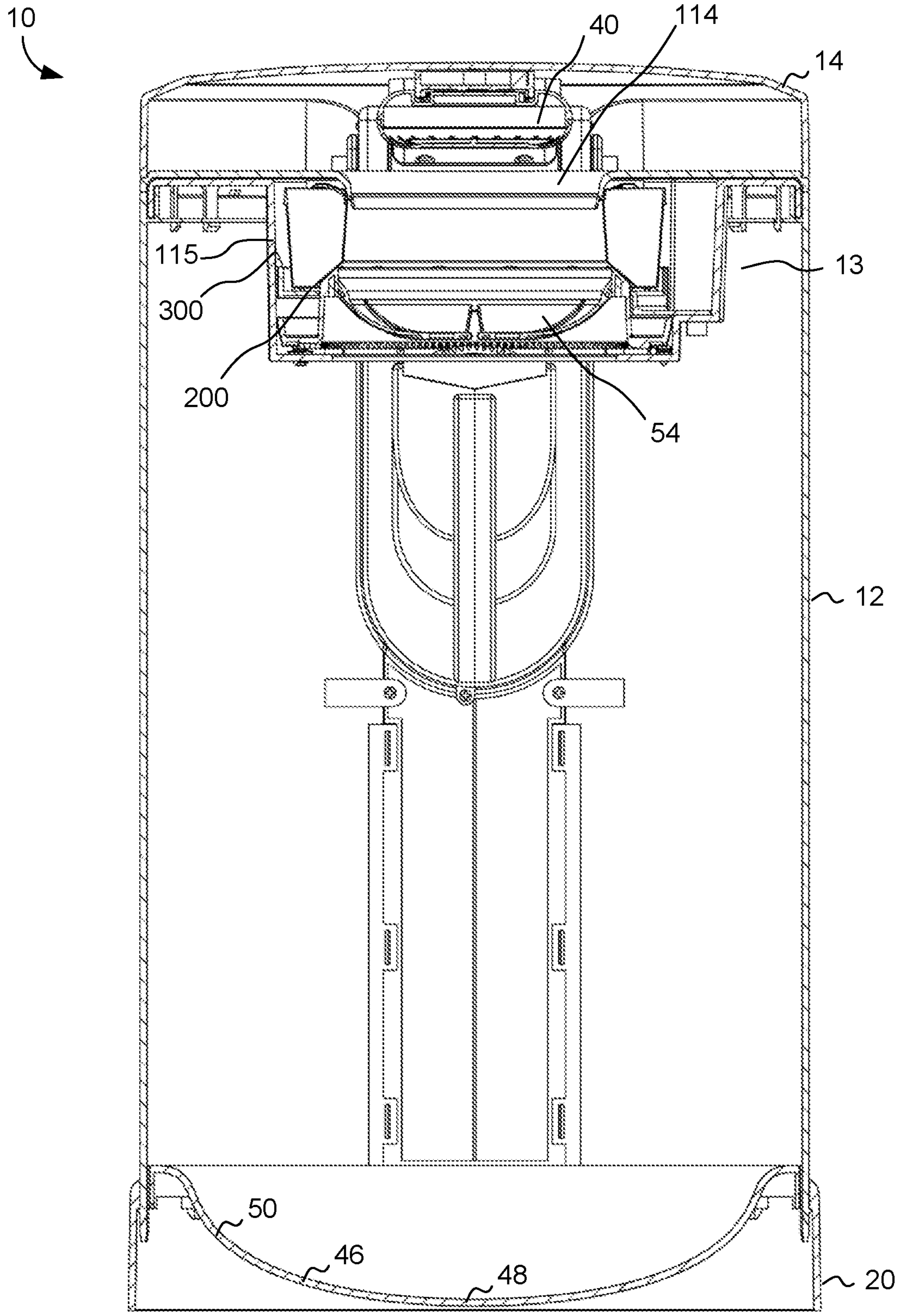
FIG. 29 shows a front cross section view of the pail assembly with the cassette disposed therein.
Figure 30:
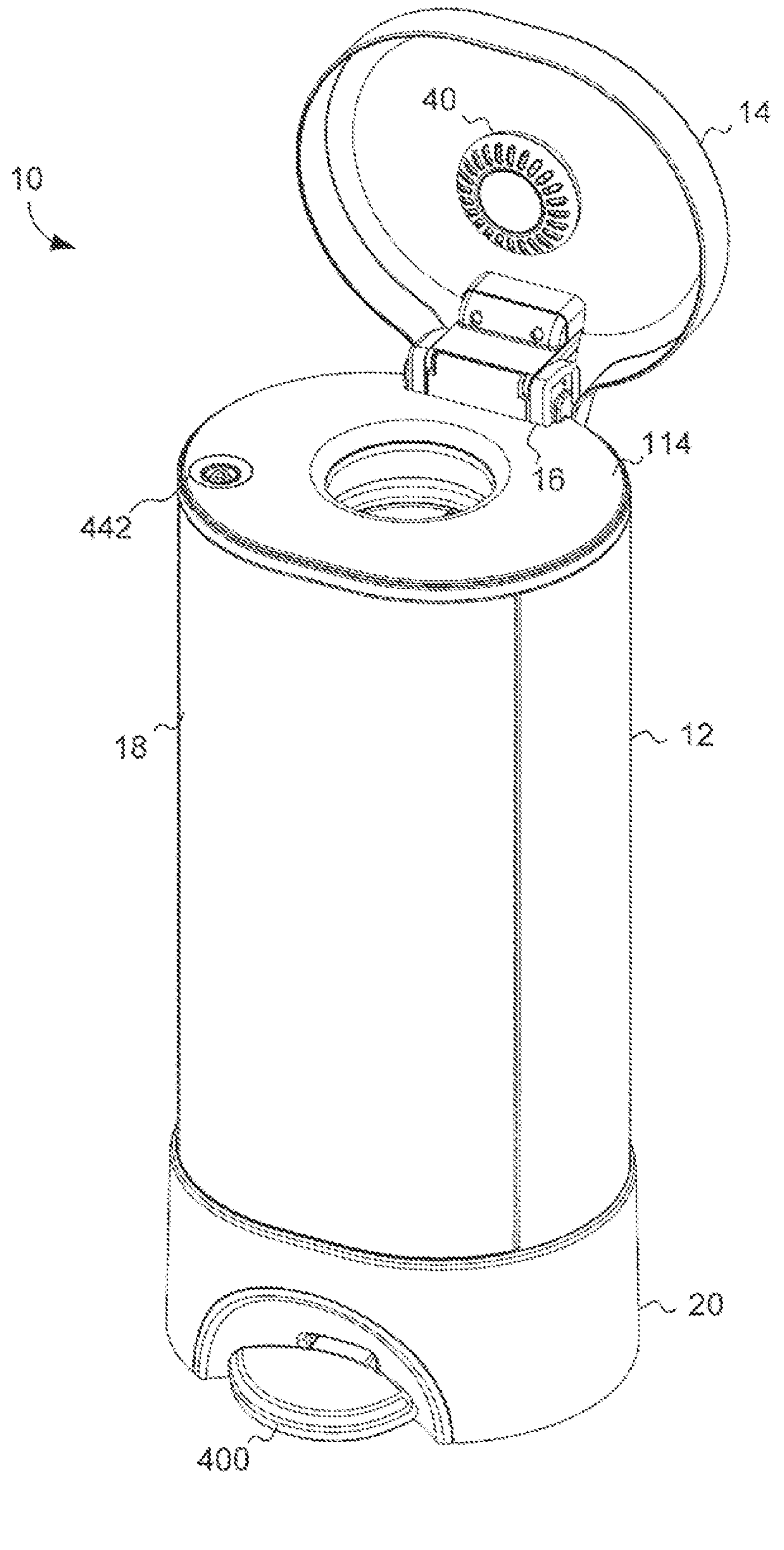
FIG. 30 depicts a front top perspective view of the pail assembly with foot pedal and lid open.
Figure 31:
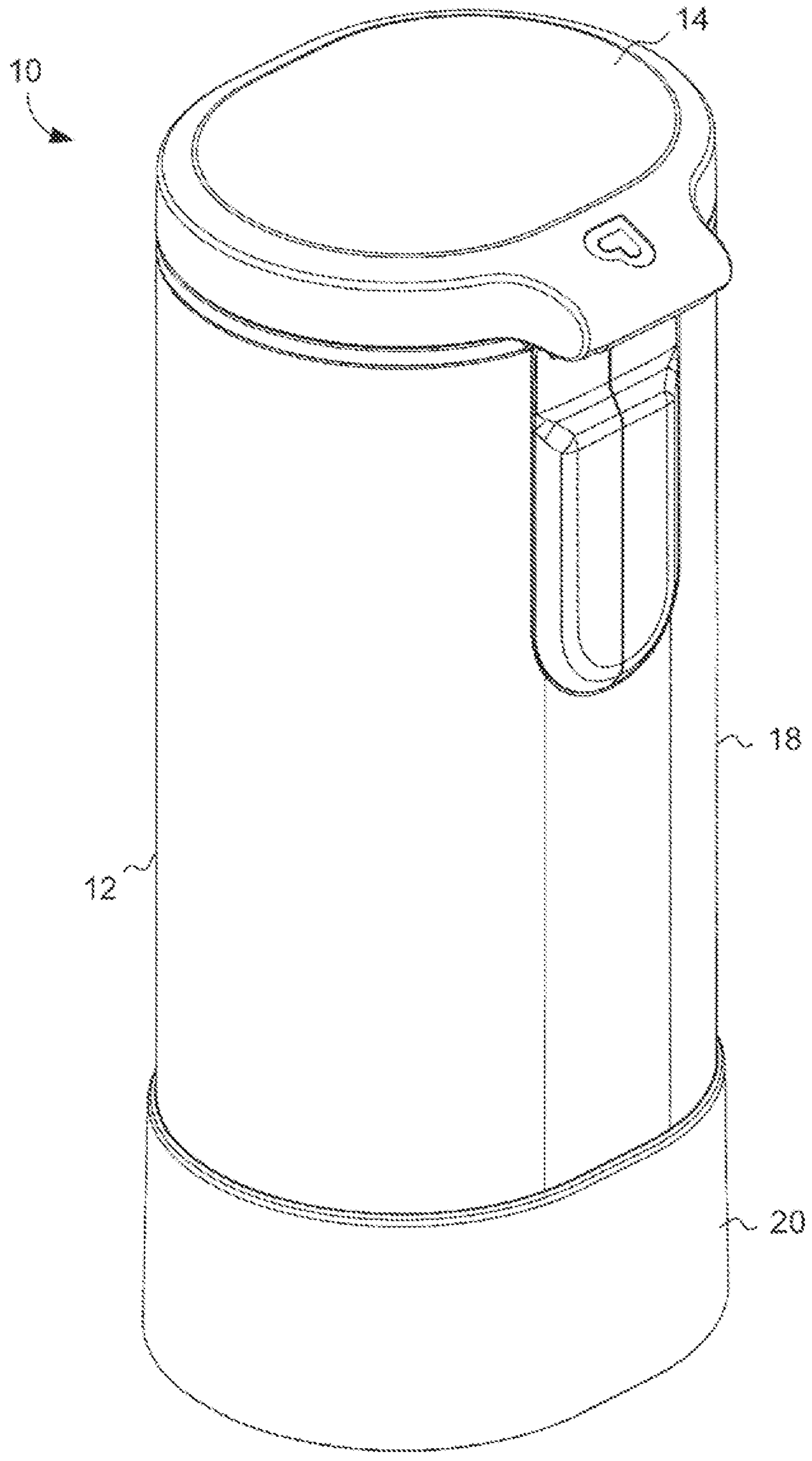
FIG. 31 depicts a back top perspective view of the pail assembly with foot pedal.
Figure 32:
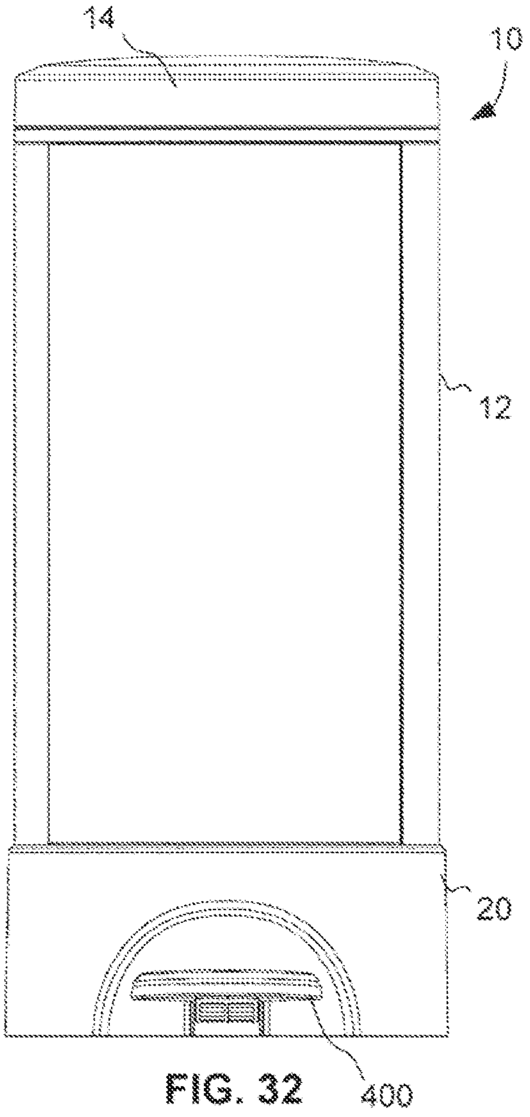
FIG. 32 shows a front view of the pail assembly with the foot pedal assembly.
Figure 33:
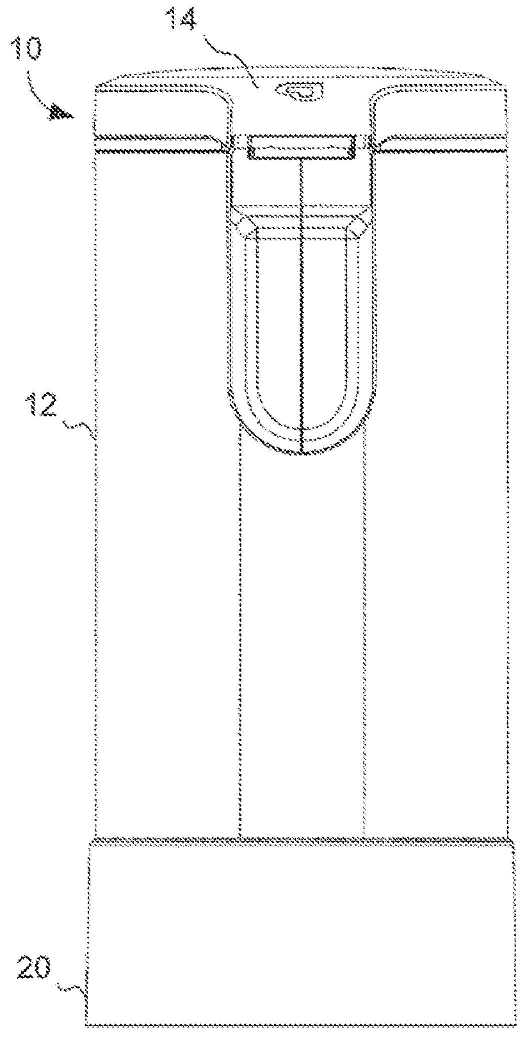
FIG. 33 illustrates a rear view of the pail assembly with the foot pedal assembly.
Figure 34:
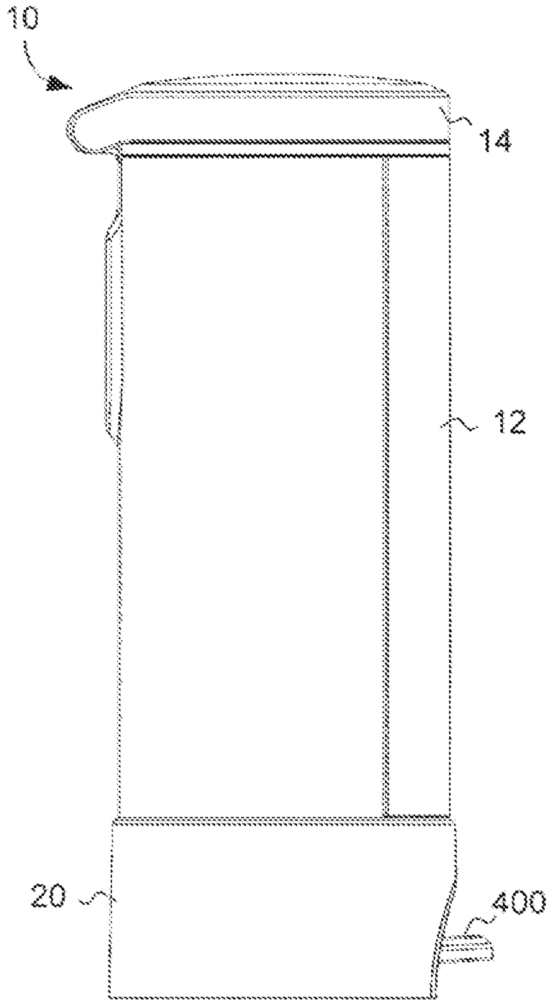
FIGS. 34-37 depict a left, a right, a top and bottom view of the pail assembly.
Figure 35:
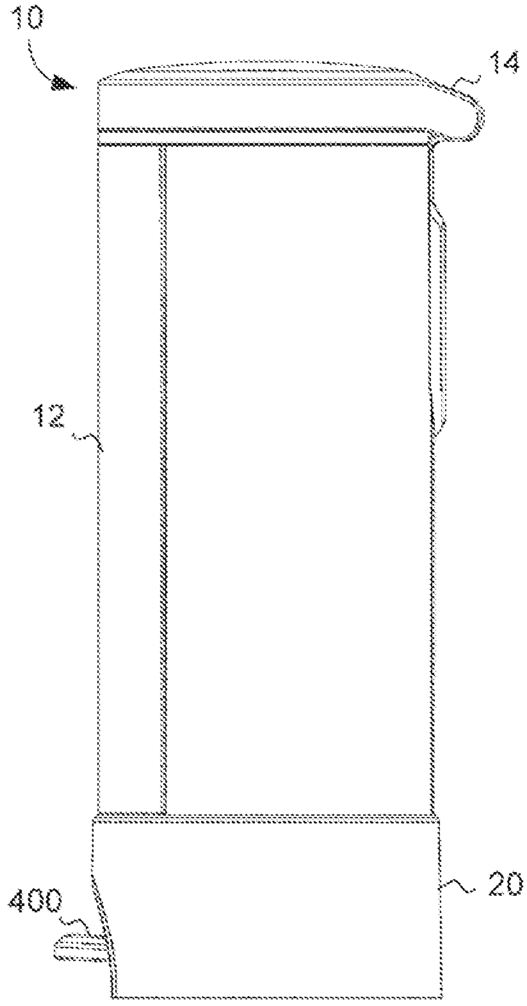
Figure 36:
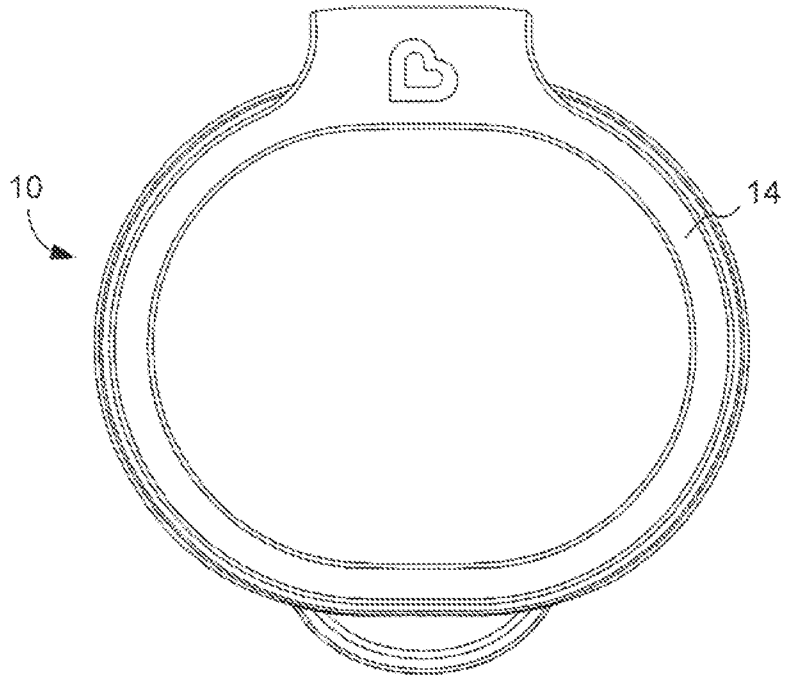

In detail, FIG. 22 depicts the interconnection between the internal lid 114, the cassette 310 and the flexible tubing 312 drawn from within the cassette 310. When the internal lid 114 is locked over the cassette 310 and the flexible tubing 312 is also secured in position, a slight compression force acts on the flexible tubing 312 to hold it in position at a junction where an inner curved portion 230 of the internal lid 114 is biased against an outer surface of the annular cover 340. In this manner, when a user pushes an article of waste through the opening 350 in the flexible tubing 312, the downward pressure of pushing the article of waste into the opening 350 in the flexible tubing 312 does not overcome the compression gripping force on the flexible tubing 312 between the inner curved portion 169 of the internal lid 114 and the outer surface 342 of the annular cover 340 thereby preventing any further tubing 312 from being pulled out of the cassette 310 while the internal lid 114 is closed shut.

The diaper pail assembly 10 may be constructed in a variety of different shapes and or sizes. FIGS. 23-29 illustrate front, rear, right, left side, top, bottom and a cross section view of one exemplary embodiment for the diaper pail assembly 10. In an alternative construction, the diaper pail assembly 10 may be embodied with a foot pedal mechanism 400. FIGS. 30-38 perspective, illustrate front, rear, right, left side, top, bottom and a cross section view of another exemplary embodiment for the diaper pail assembly 10 including the foot pedal mechanism 400.

Figure 39:
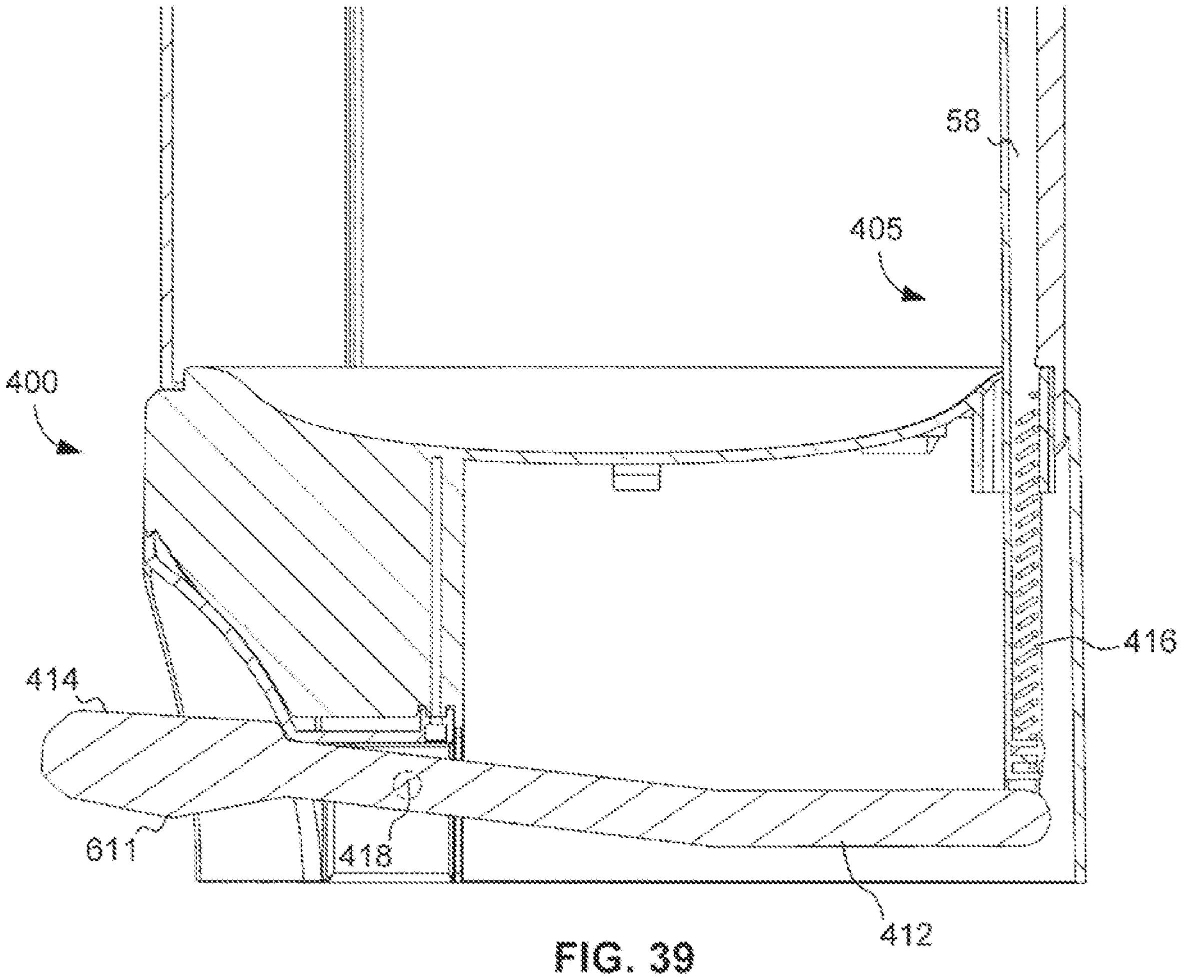
FIG. 39 illustrates a lower cross section view of the foot pedal assembly disposed in the pail assembly.

The foot pedal mechanism 400 may be used in the diaper pail assembly 10 such as shown in FIG. 39. The foot pedal mechanism 400 may utilize the basic structure of the lower end of the foot pedal mechanism such as shown in U.S. Pat. No. 2,910,206 (expired), the entire disclosure of which is hereby incorporated by reference as if set fourth fully herein.

As shown in FIG. 39, the pedal bar 412 has a fulcrum 418 at a midpoint to pivot the pedal bar 412 in a seesaw motion when the foot pedal 414 disposed at a first end of the foot pedal mechanism 400 is depressed. A push rod connection mechanism 405 includes a secure mating connection between a first vertical bar 416 and the push rod member 58. The push rod connection mechanism 405 is attached to a second end of the foot pedal bar 412 and translates upward when the first end of the foot pedal mechanism 400 is depressed. The upward motion of the first vertical bar 416 is attached by the secure mating connection to the upper push rod member 58. The upper end of the second vertical bar 58 engages the lid 14 and forces the lid 14 open when the foot pedal 414 is depressed.

FIGS. 38-43 depict various images of the push rod connection 405 between the first vertical bar 416 and the push rod member 58. The lower first vertical bar 416 is in communication with a depressible projection 414. The peripheral end of the lower first vertical bar 416 has a tapered end 422.

Figure 41:
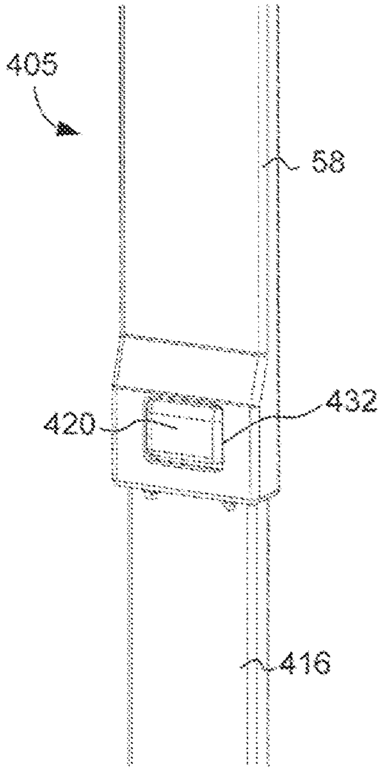
FIGS. 40-43 depict various views of an upper and lower push rod of a push rod connection in the pail assembly.
Figure 40:
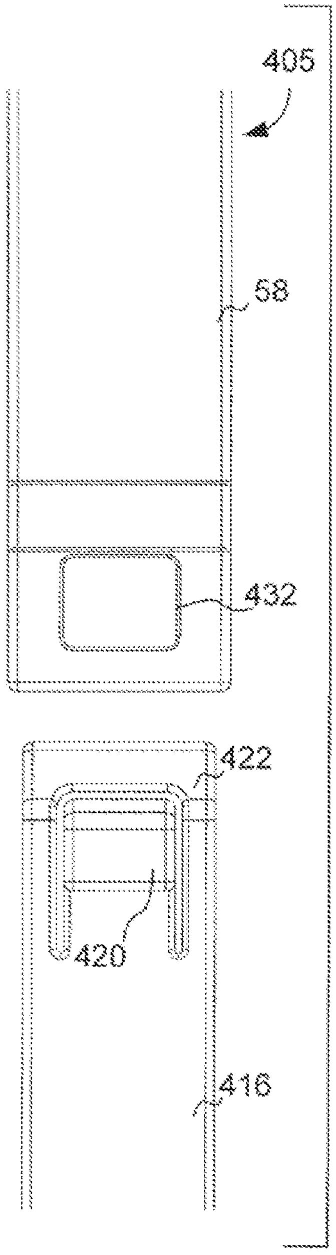
Figure 42:
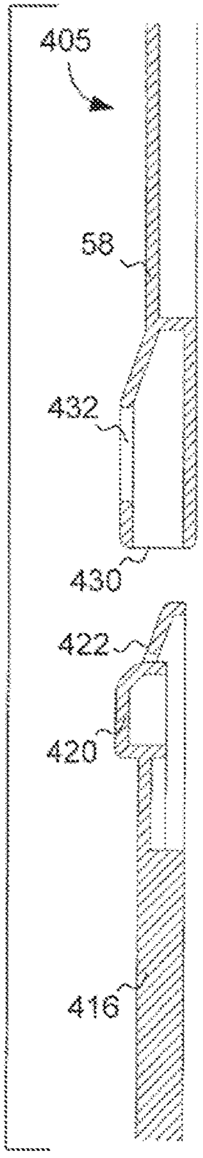
Figure 43:
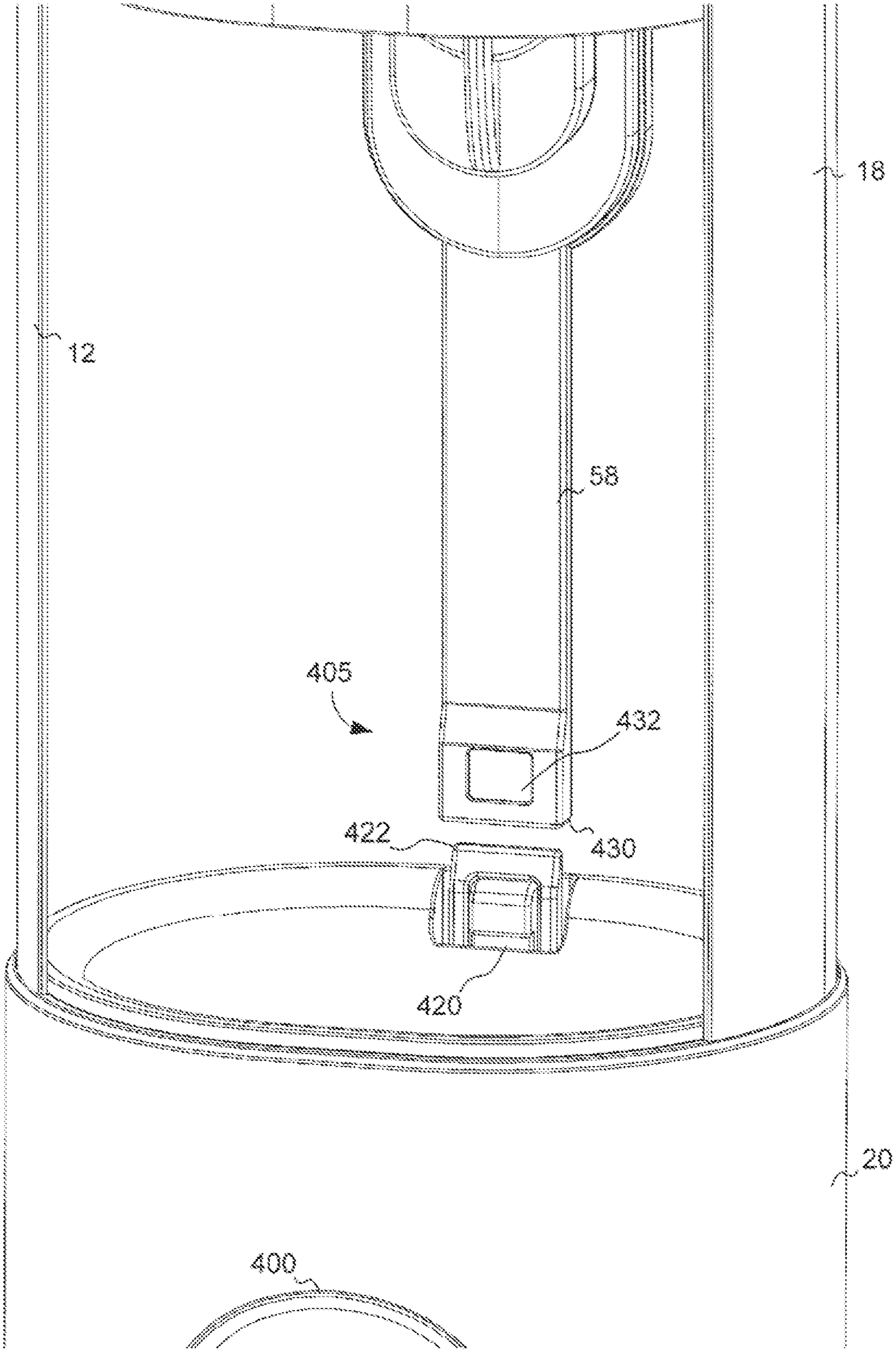

The push rod member 58 includes a lower open end 430 adapted to receive the tapered end 422 of the first vertical bar 416. The push rod member 58 includes an opening 432 into which the projection 420 may slide into such as shown in FIG. 41.

The embodiment show in FIGS. 40-43 allow for the body portion 12 and base portion 20 to be separately manufactured and shipped disconnected. They may easily by connected using the seat belt locking mechanism shown in these figures. Disconnection is simply initiated by depressing the projection 420 from . . . the opening 432 to disengage the connection between 58 and 416, thereby separating the body portion 12 from base portion 20.

FIGS. 1-2 and 44-46 illustrate a button 442 for an exemplary door latching mechanism 440. When the button 442 is depressed, the door latching mechanism 440 is engaged and the door 18 on the housing 12 may be released for access into the interior storage space 13 portion of the housing 12.

Figure 44:
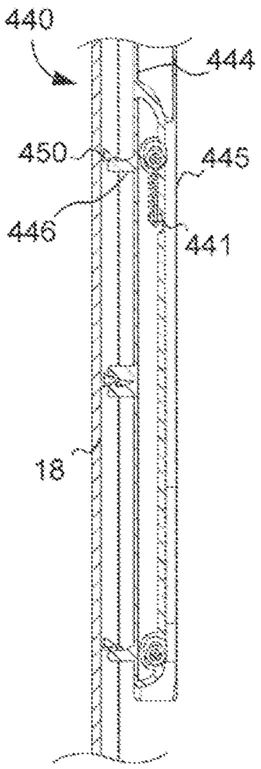
FIGS. 44-46 show various views the door latching mechanism in the pail assembly.
Figure 45:
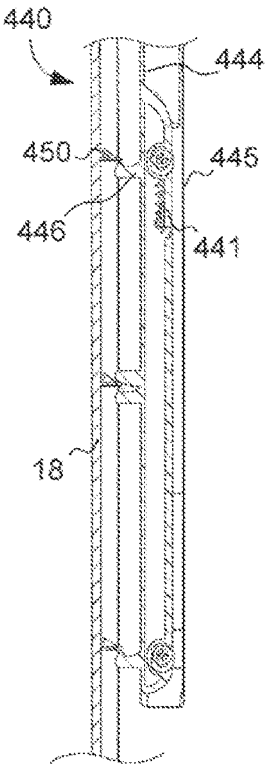
Figure 46:
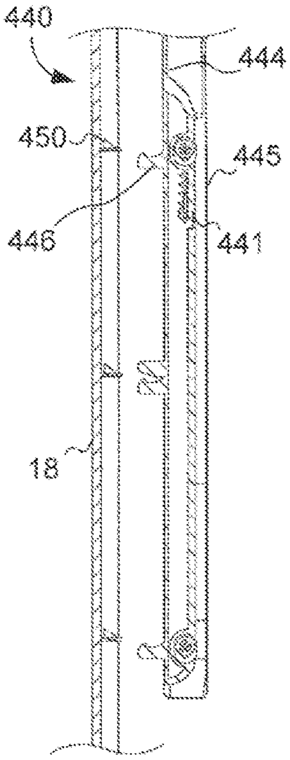

As shown in FIGS. 44-46, the door latching mechanism 440 includes a vertical post 444 connected to the button 442 that translates along a guide 445. The vertical post 444 includes at least one male latch 446 that can be removably latched to a female locking opening 450 disposed on the door 18 of the housing 12. In use, the vertical post 444 moves downward when the button 442 is depressed a predetermined distance so that the latch 446 can clear the catch 450. Spring 441 maintains the guide 445 in an upward position until the button 442 is pressed, thereby releasing the door latching mechanism 440 from the door 18.

Figure 47:
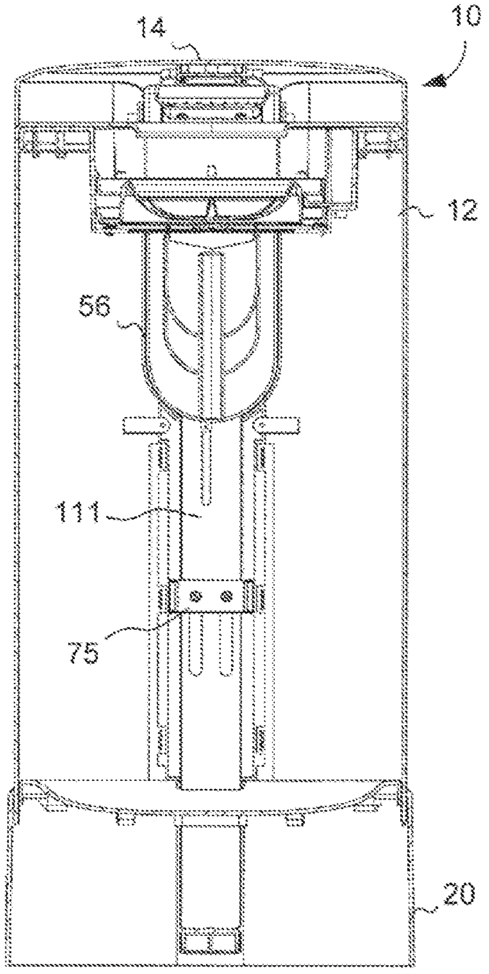
FIGS. 47-48 show a back and side cross section view of the pail assembly with the cassette and foot pedal disposed therein.
Figure 48:
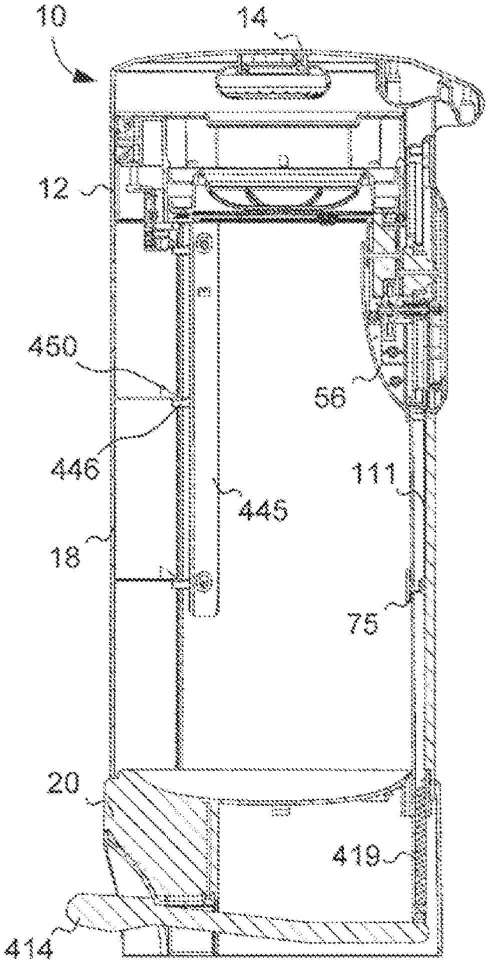
Figure 49:
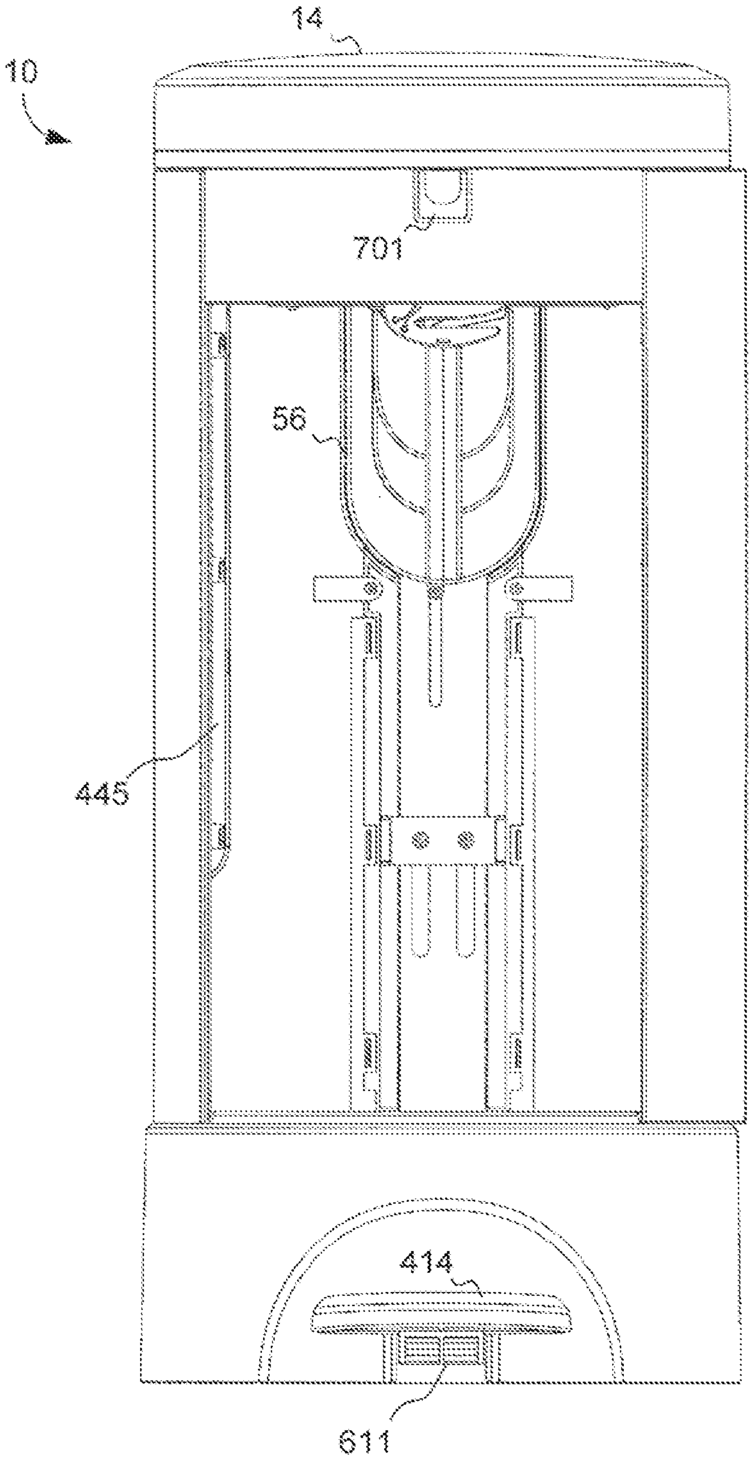
FIG. 49 shows a front cross section view of the pail assembly with the foot pedal mechanism disposed therein.

As shown in FIGS. 47-48, a single vertical foot pedal arm 111 may be used instead of the mechanism shown in FIGS. 40-43. In this embodiment, depressing of the foot pedal 414 serves to act against a downward force of spring 419 and push the foot pedal arm 111 in a vertical manner for a limited distance as determined by guide 75, which translates to the turning of the transmission mechanism 56 to open the lid 14.

Figure 37:
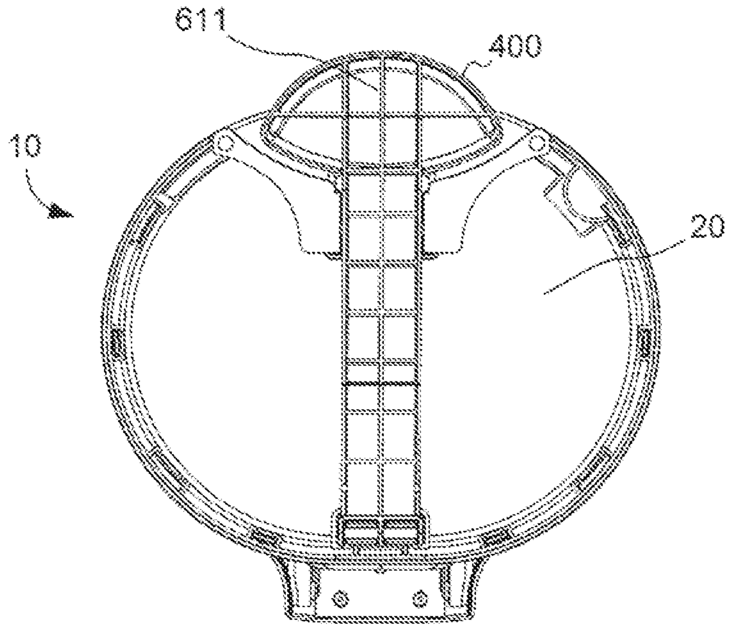
Figure 38:
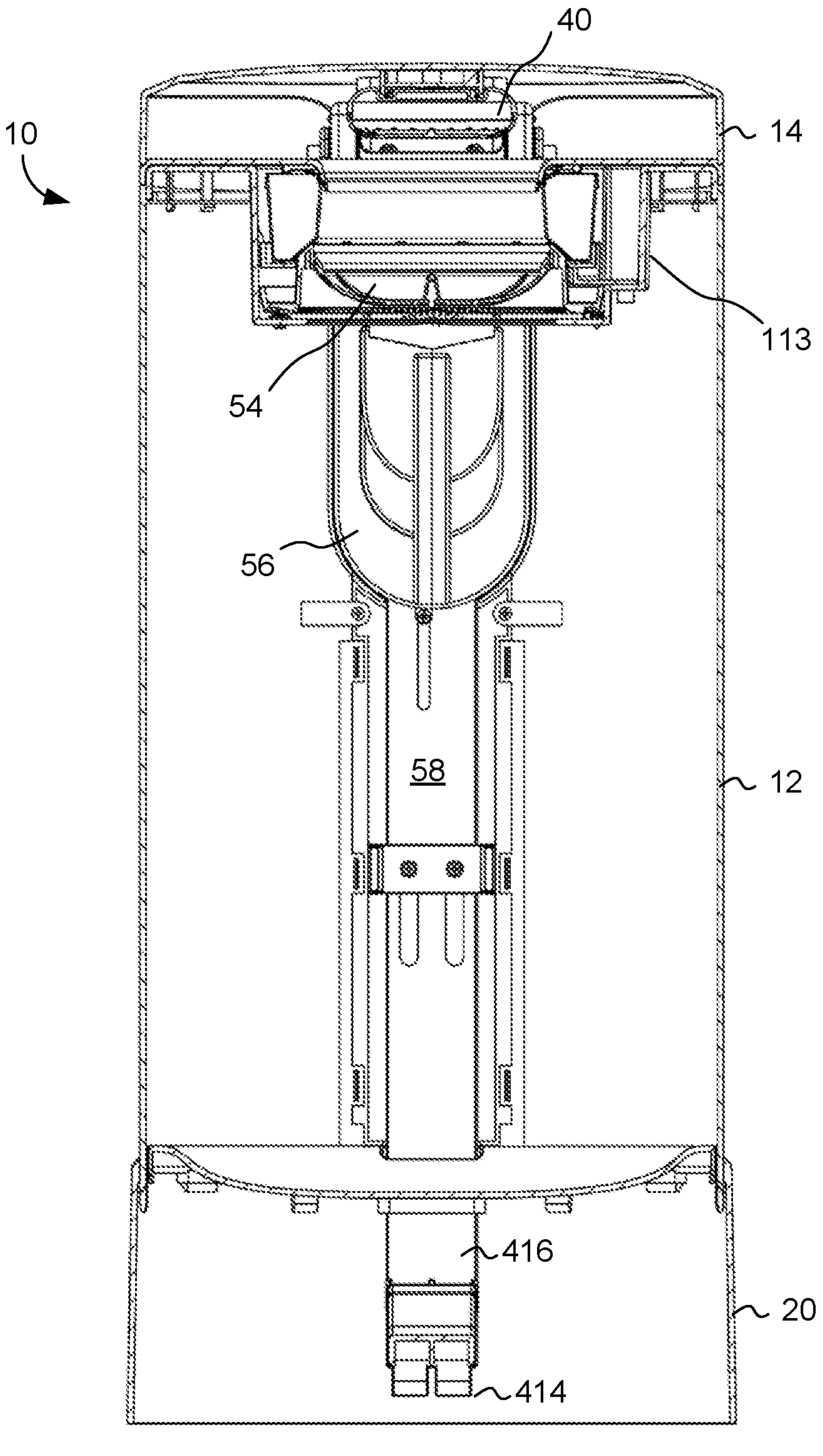
FIG. 38 shows a front cross section view of the pail assembly with the cassette and foot pedal disposed therein.

As shown in FIGS. 37, 39 and 48, foot pedal 414 has raised ribs 611 underneath it, which serve as a hard stop to ensure a limit to the downward . . . movement of foot pedal 414. The extent of the ribs underneath the foot pedal 414 is only so much as to allow for the opening of the lid 14, but not so much as to flip the lid over and possibly tip the container 12. The raised ribs also serve to provide a stable constant surface with the floor upon full downward press of the foot pedal 414 such that the raised ribs are flush against a hard surface, or are buried into a soft surface, such as carpet. This feature allows for the activation of the opening of the lid 14 without tipping over the container 12.

As shown in FIGS. 49-52, the internal lid 114 may be released from its downward locked position upon depressing a latch button 701. Pushing the latch button 701 disengages its attached catch mechanism 702 from a receiving latch hook 703 on the interior lid 114. Further, the internal lid 114 contains a button accommodating orifice 704 which is designed to allow the user access to button 442 that releases the door 18, without having to open the internal lid 114.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed is:

1. A container, comprising:

a base;

a lid assembly having a top lid and an internal lid;

a housing having an interior storage space and a hinge attaching the lid assembly to the housing; and a waste chamber disposed in the housing that is adapted to receive a flexible bag assembly having either a single bag or tubing, said waste chamber having:

a first stationary support member adapted to receive the single bag;

a second stationary support member adapted to receive the tubing;

an annular cylindrical recess; and a rotatable member having a resilient opening into the interior storage space, wherein the rotatable member is adapted to rotate and twist a portion of the bag or the tubing to create a seal in the flexible bag assembly when the top lid is closed.

2. The container of claim 1, further comprising a plurality of protruding keys in the rotatable member for securing the flexible bag assembly therein.

3. The container of claim 1, wherein the flexible bag assembly is a singe use bag having a frame.

4. The container of claim 3, a wherein the first support structure in the waste chamber has a plurality of recesses and tab clips for receiving complementary aligning tabs disposed on the frame.

5. The container of claim 1, wherein the flexible bag assembly is a cassette for dispensing pleated tubing.

6. The container of claim 5, wherein the second support structure in the waste chamber is adapted to receive and secure the cassette.

7. The container of claim 6, wherein a bottom portion of the cassette includes a plurality of apertures disposed therein.

8. The container of claim 7, wherein the second support structure includes a plurality of protruding keys that mate with the plurality of apertures to align the cassette in the waste chamber.

9. The container of claim 1, further comprising a transmission mechanism that drives a gear mechanism in order to rotate the bottom structure.

10. The container of claim 9, wherein the rotatable member rotates when the top lid is closed.

11. The container of claim 10, further comprising a foot pedal that is connected to the top lid such that it is adapted to open the top lid when depressed by a user.

12. A container, comprising:
- a housing having an interior storage space;
- a waste chamber having:
  - a first stationary support member adapted to receive a single bag;
  - a second stationary support member adapted to receive a tubing;
  - an annular cylindrical recess;
  - a resilient opening leading into the interior storage space; and
  - a rotatable member adapted to receive a flexible bag assembly having either the single bag or the tubing therein, and to rotate and twist a portion of the bag or the tubing to create a seal in the flexible bag assembly.

13. The container of claim 12, further comprising a lid assembly having:
- a top lid;
- an internal lid; and
- a hinge that attaches the top lid and the internal lid to the housing.

14. The container of claim 13, further comprising a transmission mechanism that links the rotatable bottom structure to the top lid.

15. The container of claim 14, wherein the transmission mechanism is adapted to drive the rotatable bottom structure a predetermined rotational distance when the top lid is closed.

16. The container of claim 12, wherein the flexible bag assembly is a single use bag having a frame.

17. The container of claim 12, wherein the flexible bag assembly is a cassette for dispensing pleated tubing.

18. A container, comprising:
- a base;
- a lid assembly having a top lid and an internal lid;
- a housing having an interior storage space and a hinge attaching the lid assembly to the housing; and
- a waste chamber having:
  - a first stationary support member adapted to receive a frame of a bag comprised of a flexible material, wherein the frame is disposed on top of protruding keys in a base of the waste chamber, and under tab clips to secure the bag in place, wherein the tab clips are positioned within recesses on the first stationary member;
  - a second stationary support member adapted to receive a cassette having a tubing comprised of the flexible material packed therein; and
  - a rotatable member having a resilient opening that is adapted to rotate and twist to seal a portion of the flexible material.

19. The container of claim 18, wherein the rotatable member rotates a predetermined rotational distance when the top lid is closed.

* * * * *